(12) United States Patent
Riedisser et al.

(10) Patent No.: US 12,358,364 B2
(45) Date of Patent: Jul. 15, 2025

(54) VEHICLE TRANSMISSION

(71) Applicant: ZF Friedrichshafen AG, Friedrichshafen (DE)

(72) Inventors: Thomas Riedisser, Sigmarszell (DE); Wolfgang Schmid, Tettnang (DE); Leschek Debernitz, Eriskirch (DE); Thomas Dirheimer, Lindau-Oberreitnau (DE); Manuel Schwaerzler, Friedrichshafen (DE); Florian Pöhnlein, Stefansfeld (DE); Daniel Haase, Lindau (DE); Peter Reinders, Markdorf (DE); Martin Kibler, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 352 days.

(21) Appl. No.: 18/103,877

(22) Filed: Jan. 31, 2023

(65) Prior Publication Data

US 2023/0241959 A1   Aug. 3, 2023

(30) Foreign Application Priority Data

Feb. 1, 2022   (DE) ..................... 10 2022 201 014.0

(51) Int. Cl.
*B60K 6/405*   (2007.10)
*B60K 6/547*   (2007.10)
(Continued)

(52) U.S. Cl.
CPC .............. *B60K 6/405* (2013.01); *B60K 6/547* (2013.01); *F16H 57/027* (2013.01);
(Continued)

(58) Field of Classification Search
CPC ........................... B60K 6/405; B60Y 2200/92
See application file for complete search history.

(56) References Cited

U.S. PATENT DOCUMENTS 5,415,603 A * 5/1995 Tuzuki ................ F16H 61/0206
903/906
10,995,818 B2   5/2021 Weber et al.
(Continued)

FOREIGN PATENT DOCUMENTS

DE   102011080710 A1   2/2013
DE   102016211942 A1   1/2018
(Continued)

OTHER PUBLICATIONS

German Search Report DE 10 2022 201 014.0, dated Aug. 31, 2022. (12 pages).

*Primary Examiner* — Brian L Swenson
(74) *Attorney, Agent, or Firm* — Dority & Manning, P.A.

(57) ABSTRACT

A vehicle transmission includes a transmission housing defining an oil sump space and a hybrid space, with the hybrid space being arranged vertically above the oil sump space. The transmission further includes a first oil guide shell and a second oil guide shell each fixed to the transmission housing. Additionally, the transmission includes rotating components installable in a portion of the hybrid space between the first oil guide shell and the second oil guide shell in an axial direction, where the rotating components includes at least one electric machine, a damper, and a torsional shock absorber. Two contactless gap seals are formed by one of the oil guide shells and at least one of the rotating components such that oil entry from the oil sump into the portion of the hybrid space is delimited axially by the oil guide shells and radially by the gap seals.

17 Claims, 21 Drawing Sheets

(51) Int. Cl.
  *F16H 57/027* (2012.01)
  *F16H 57/029* (2012.01)
  *F16H 57/04* (2010.01)
  *H02K 5/20* (2006.01)
  *H02K 5/24* (2006.01)
  *H02K 7/102* (2006.01)
  *H02K 7/116* (2006.01)
  *H02K 9/193* (2006.01)
  *H02K 11/21* (2016.01)
  *F16H 57/02* (2012.01)

(52) U.S. Cl.
  CPC ....... *F16H 57/029* (2013.01); *F16H 57/0423* (2013.01); *F16H 57/0436* (2013.01); *F16H 57/0452* (2013.01); *F16H 57/0456* (2013.01); *F16H 57/0476* (2013.01); *H02K 5/203* (2021.01); *H02K 5/24* (2013.01); *H02K 7/102* (2013.01); *H02K 7/116* (2013.01); *H02K 9/193* (2013.01); *H02K 11/21* (2016.01); *B60Y 2200/92* (2013.01); *F16H 2057/02034* (2013.01); *F16H 2057/02043* (2013.01); *H02K 2205/09* (2013.01)

(56) References Cited

U.S. PATENT DOCUMENTS

| | | | |
|---|---|---|---|
| 11,548,367 | B2 | 1/2023 | Gyarmati et al. |
| 2013/0062980 | A1* | 3/2013 | Kuwahara ............... B60K 6/48 310/78 |
| 2013/0305878 | A1* | 11/2013 | Seno .................. F16H 57/0482 74/665 A |
| 2019/0084401 | A1* | 3/2019 | Moasherziad .......... F16H 57/00 |
| 2022/0055471 | A1* | 2/2022 | Ideue ...................... H02K 9/19 |
| 2023/0063044 | A1* | 3/2023 | Nishiyabu ............... B62M 7/02 |
| 2024/0066972 | A1* | 2/2024 | Kim ....................... H02K 7/006 |
| 2024/0333104 | A1* | 10/2024 | Greiter ............... F16H 57/0476 |
| 2025/0062661 | A1* | 2/2025 | Kordvee ............... H02K 5/203 |

FOREIGN PATENT DOCUMENTS

| | | |
|---|---|---|
| DE | 102016211945 A1 | 1/2018 |
| DE | 102019212670 A1 | 2/2021 |

* cited by examiner

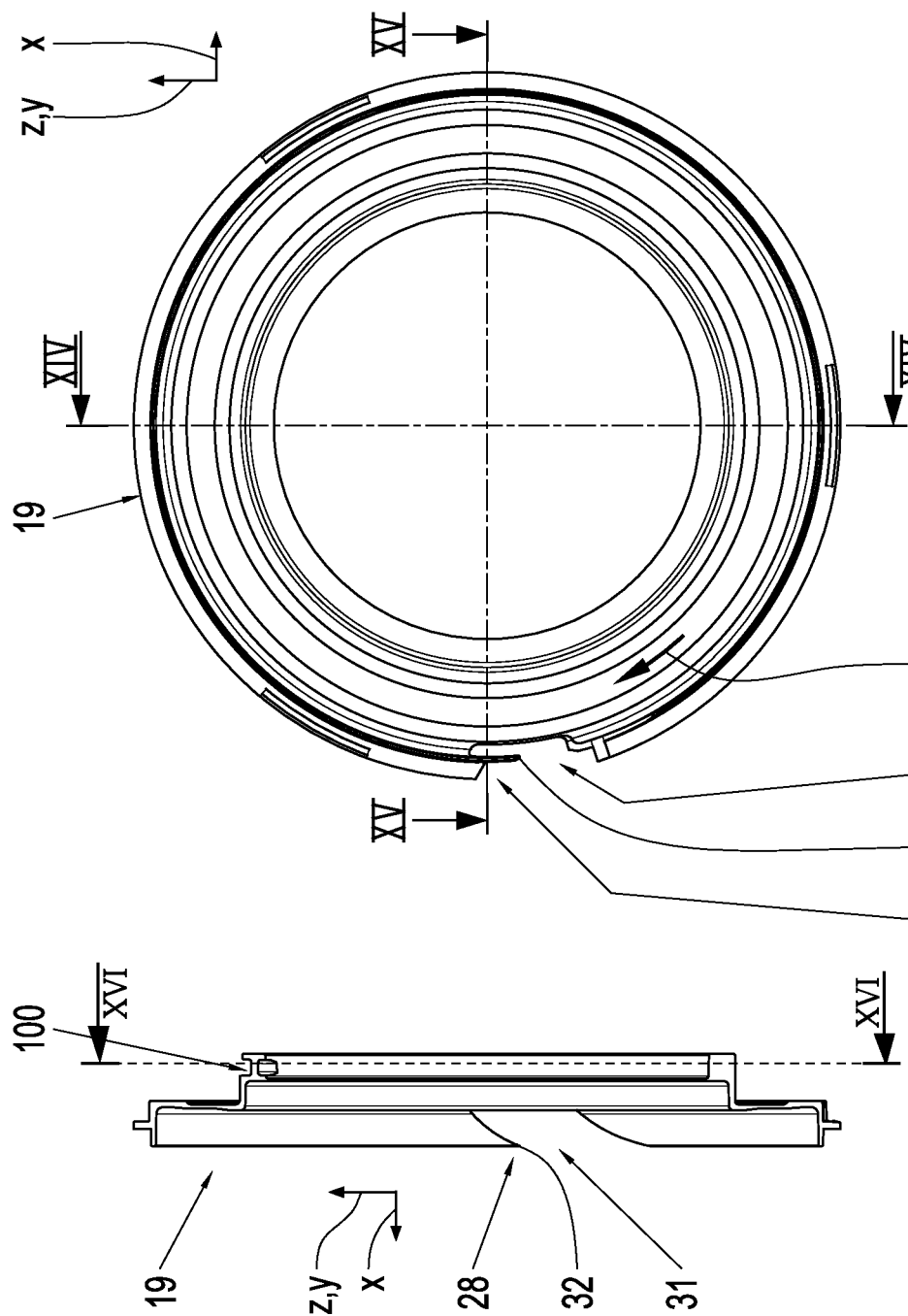

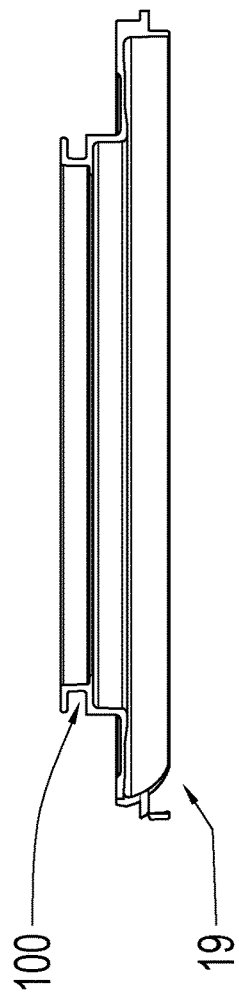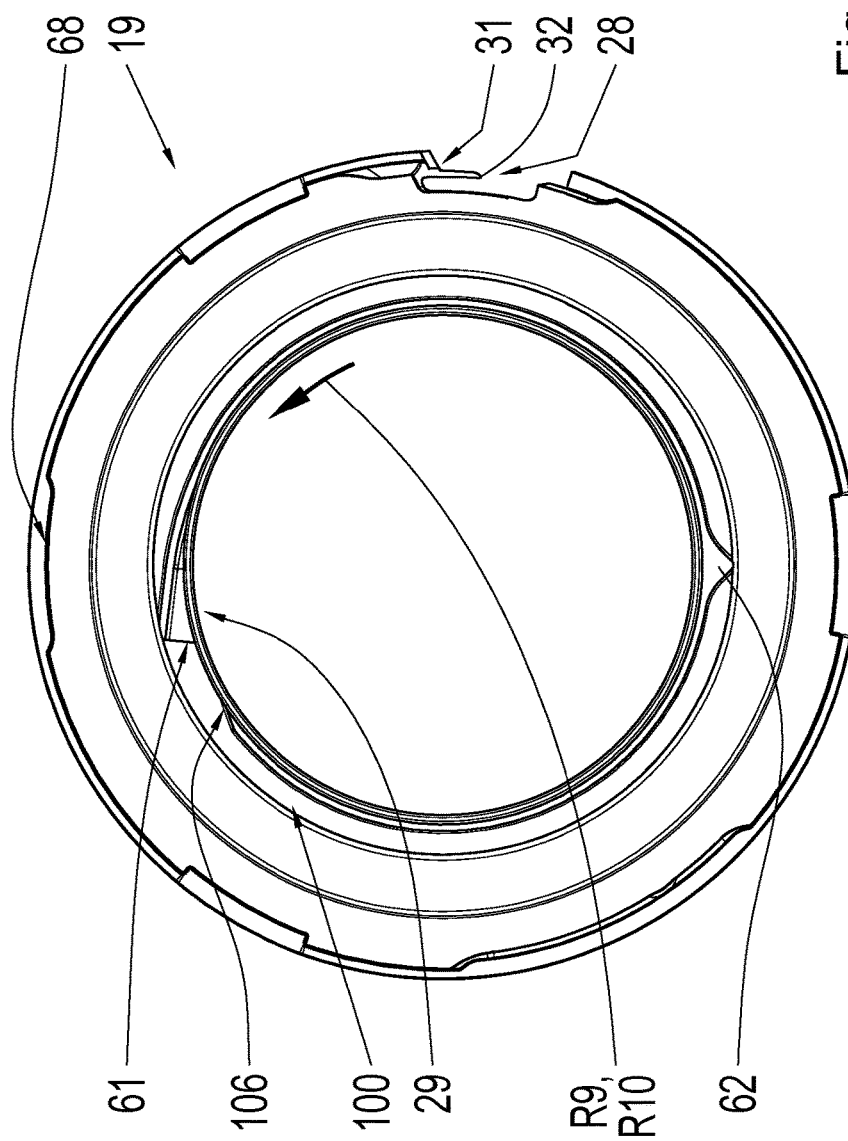

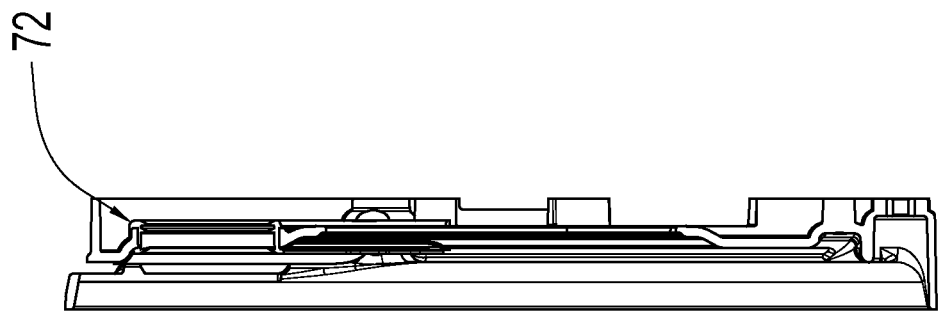
Fig. 18A
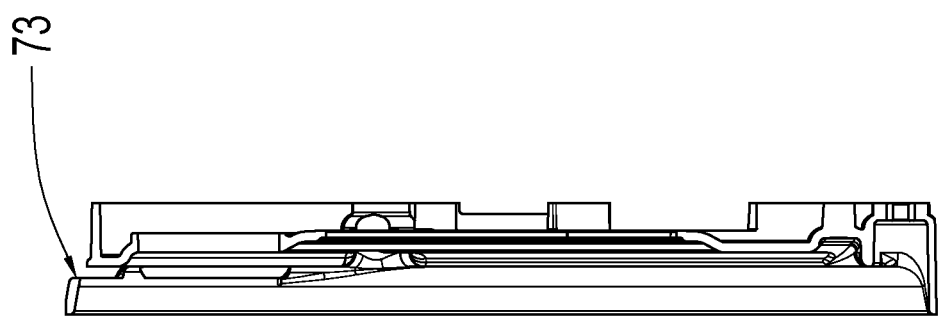
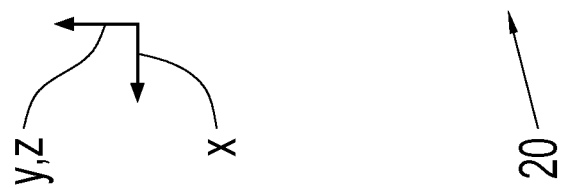
Fig. 18B

VEHICLE TRANSMISSION

CROSS-REFERENCE TO RELATED APPLICATION

The present application is related and has right of priority to German Patent Application No. 10 2022 201 014.0 filed on Feb. 1, 2022, the entirety of which is incorporated by reference for all purposes.

FIELD OF THE INVENTION

The invention relates generally to a vehicle transmission.

BACKGROUND

From practical experience, a vehicle transmission that includes a transmission housing is known, where the transmission housing delimits an oil sump space and a hybrid space. The hybrid space is provided above the oil sump space in the transmission housing on the transmission input side and in the vertical direction of the transmission housing. Moreover, various rotating components, such as an electric machine, a torsional shock absorber, and a damper, are arranged in the hybrid space. The rotational speed-adaptive damper and the torsional shock absorber are components of a torsion damper system of the vehicle transmission. A sensor ring is attached to a rotor of the electric machine, the sensor ring interacting with a rotor position sensor. A current rotation position of the rotor is determinable by the sensor ring and the rotor position sensor. In addition, the rotor of the electric machine is connected via a so-called "pre-ratio" to an input shaft of the vehicle transmission. In addition, the vehicle transmission includes a separating clutch, via which the input shaft is coupleable to a prime mover, such as an internal combustion engine, or the like. The prime mover is flange-mountable at the transmission housing on the transmission input side.

During operation of the vehicle transmission, the components of the torsion damper system, the rotor of the electric machine with the attached sensor ring, the rotor pre-ratio, and the separating clutch churn in the oil when the oil level in the transmission housing is appropriately high, the oil being located in the oil sump space and also in the area of the hybrid space facing the oil sump space. Oil adhering to the components rotating in the hybrid space is slung off of the components outwardly in the radial direction. In addition, the oil is foamed up by the components.

In the process, the rotating components in the hybrid space engage to a greater or lesser extent into the oil volume in the transmission housing as a function of the current driving mode, which is characterizable, among other things, by a vehicle acceleration or a vehicle deceleration, and as a function of the current oil temperature.

In order to avoid drag losses and undesirable churning of oil, and oil turbulence in the transmission housing, attempts are made to ensure that the static oil level in the oil sump space, at room temperature, is slightly below the rotating components in the hybrid space. This is implementable for nearly all rotating components in the hybrid space. If the temperature of the oil in the oil sump space increases, however, the oil volume in the oil sump space expands and the oil level rises toward the rotating components in the hybrid space.

Above a defined oil level in the oil sump space, both the damper and the rotor of the electric machine dip into the oil volume in the oil sump space. Due to the large diameters and the high circumferential speeds of the rotating components in the hybrid space, the oil in the oil sump space is intensively churned and turbulently swirled up. This is the case, in particular, when the speed of rotor of the electric machine is further increased by a rotor pre-ratio for increasing torque. If the rotor pre-ratio has, for example, a value of approximately 1.6, the rotor of the electric machine rotates 1.6-fold faster than the input shaft. Similarly, due to a considerably turbulent oil-air flow in the hybrid space, the risk of an oil discharge out of the transmission breather increases.

During operation of the vehicle transmission, a shift element (a friction-locking brake) is also supplied with cooling oil, the shift element being installed directly within an intermediate plate of the oil supply system. The cooling oil flowing off the shift element is guided from the shift element through the hybrid space into the oil sump space for the so-called "de-oiling" of the shift element. If the oil level in the oil sump space increases with the temperature, there is a risk that the oil level will rise above a de-oiling duct of the brake. An undesirable oil back-up in the brake arises. Due to an oil back-up of this type, further shift elements of the vehicle transmission become flooded with oil, as the result of which drag torques increase to a non-negligible extent.

SUMMARY OF THE INVENTION

The present invention reduces or eliminates at least one disadvantage of a known approach or to provide an alternative approach. In particular, the present vehicle transmission is improved with respect to at least one of the following factors: manufacturing costs, manufacturing time, complexity of the manufacture, utilization of installation space, operational reliability, sustainability, and/or component reliability. Further advantages arise from the advantageous effects of the technology disclosed here.

Particularly, the present invention avoids or reduces a churning of oil, an oil turbulence, and undesirable drag torques in a vehicle transmission in a structurally simple way.

A vehicle transmission that includes a transmission housing is provided, the transmission housing delimiting an oil sump space and a hybrid space, the hybrid space preferably being arranged on the transmission input side. At least one electric machine, a torsional shock absorber, and a damper are provided as rotating components in the hybrid space. In an installed position of the vehicle transmission in a vehicle, the hybrid space is arranged above the oil sump space in a vehicle vertical direction.

In accordance with aspects of the present subject matter, the rotating components of the hybrid space are arranged in an axial direction between two housing-affixed oil guide shells. An entry of oil from the oil sump space into the portion of the hybrid space, in which the rotating components are arranged, is delimited in an axial direction by the oil guide shells and in a radial direction by two contactless gap seals. The two gap seals are each formed by one of the oil guide shells and a rotating component arranged in the hybrid space.

The gap of the gap seal is easily delimited in each case by surfaces of the oil guide shells and of the particular associated rotating component, which face one another.

The gap widths of the gap seals between the first oil guide shell and the damper or the rotor of the electric machine, and also between the second oil guide shell and the rotor, are preferably kept as small as possible, for the reason that leakage oil amounts, which flow out of the oil sump space into the hybrid space when the oil level in the oil sump space rises, are to be kept as low as possible. Contact between the oil guide shells and the damper or the rotor of the electric machine is reliably avoided via sufficiently great gap widths or gap seal widths. For this purpose, the axial and the radial nominal distances between the first oil guide shell and the damper or between the oil guide shells and the rotor of the electric machine is from 1 mm to 3 mm in one preferred embodiment of the vehicle transmission.

In other words, in the present vehicle transmission, the churning of oil, the swirling of oil in the transmission housing, and undesirably high drag torques during operation of the vehicle transmission are easily reduced or avoided due to a contactless sealing-off of the rotating components in the hybrid space with respect to the oil volume that is present in the oil sump space.

One embodiment of the vehicle transmission, a low number of components, including a first oil guide shell, which encircles the damper, the torsional shock absorber, and a rotor of the electric machine on the input side in a radial direction and in an axial direction are provided, where these components are sealed off with respect to the oil in the oil sump space.

The first oil guide shell has two oil discharge areas or oil ejectors, through which oil is guidable out of the hybrid space. For instance, the first oil discharge area is providable radially outside the damper and the second oil discharge area is providable axially directly next to a laminated core of the rotor of the electric machine.

The two oil discharge areas offer a structurally simple way to discharge the oil volume, including leakage oil from the oil sump space that penetrates the hybrid space from underneath and oil introduced from an input shaft of the vehicle transmission into the hybrid space for cooling and lubricating, from the hybrid space to de-oil the hybrid space.

It is possible to arrange the first oil discharge area of the first oil guide shell preferably at an 8 o'clock position with respect to a direction of rotation of the rotating components and in the circumferential direction of the first oil guide shell, where the first oil discharge area has an oil scraper having a sharp oil-scraping edge.

The second oil discharge area of the first oil guide shell is arrangeable, for de-oiling the rotor on the input side, preferably at a 1 o'clock position with respect to a direction of rotation of the rotating components and in the circumferential direction of the first oil guide shell, where the second oil discharge area includes an oil scraper that has a sharp oil-scraping edge. In addition, the first oil guide shell has an oil drainage channel, which is open toward the outside and has a U-shaped cross-section, the oil drainage channel extending in the circumferential direction of the first oil guide shell. In addition, the first oil guide shell has an oil drainage wedge, which is arranged at a 6 o'clock position with respect to a direction of rotation of the rotating components and in the circumferential direction of the first oil guide shell.

Oil is then guidable in a targeted manner out of the hybrid space by the rotating components via the two oil discharge areas and is subsequently directable to the input-side stator windings of the electric machine in the hybrid space. The stator windings of the electric machine are acted upon and cooled by oil from the outside via the first oil discharge area and from the inside via the second oil discharge area.

In another advantageous embodiment of the vehicle transmission according to the invention, the second oil guide shell, together with a sensor ring of the electric machine, forms a so-called "taper pump." The taper pump is arranged axially directly next to an oil discharge area of the second oil guide shell. The oil discharge area of the second oil guide shell includes an oil scraper and an oil-scraping edge. The oil discharge area of the second oil guide shell is arranged at a 10 o'clock position in the circumferential direction of the second oil guide shell and with respect to a direction of rotation of the rotating components in the hybrid space, and is provided on the output side axially next to the laminated core of the rotor of the electric machine.

In addition, in some instances, the taper pump is formed by a tapered inner surface of the second oil guide shell and a tapered outer surface of the sensor ring of the electric machine, with the tapered outer surface being oriented parallel to the tapered inner surface. The vehicle transmission then has a structurally simple configuration.

Axial gap widths between the sensor ring and the second oil guide shell preferably have nominal sizes from 1 mm to 3 mm, in particular of 2 mm. After subtracting all tolerances, an axial minimum gap of approximately 0.5 mm is set in during operation of the vehicle transmission.

The radial gap width between the sensor ring and the second oil guide shell preferably has a nominal size in the area of the taper pump between 0.5 mm and 1.5 mm, in particular approximately 1.2 mm. During operation and after subtracting all tolerances, a radial minimum gap of approximately 0.2 mm sets in.

Due to the taper gap angle in the area of the taper pump, a preferred radially outward flow is generated during the rotation of the sensor ring attached to the rotor of the electric machine in the hybrid space. This results in oil being conveyed out of the hybrid space via the taper pump.

The taper angle of the taper pump has angle values from 5° to 30°, preferably of approximately 10°. In the presence of such taper angle values of the taper pump, a certain sealing gap length is enabled in addition to the radial removal and suction effect.

The sensor ring has a radially outward drawn shoulder in a radially outer area, which is provided on the output side of the taper pump.

This shoulder, which is formed radially outward at the sensor ring and is provided at the end of the taper angle of the taper pump, has the particular purpose of directing oil that is conveyed out of the taper pump, at the end of the taper pump in a targeted manner radially outward toward the output-side stator windings of the electric machine and cooling these stator windings circumferentially over 360°.

Simultaneously, the oil outflow from the taper pump, which is directed radially outward via the shoulder, protects the air gap between the rotor and the stator of the electric machine in the hybrid space against oil flooding, the air gap being adjacent to the input side. In other words, the radially outward drawn shoulder is an oil guide contour of the taper pump, in order to avoid drag torques in the air gap of the electric machine and to cool the stator of the electric machine in a targeted manner.

In an easily mountable embodiment of the vehicle transmission, the first oil guide shell is arranged in the transmission housing and is guidable axially into position between the transmission housing and a bearing shield of the vehicle transmission. In addition, the first oil guide shell is centered radially in the transmission housing and aligned or angularly aligned in the circumferential direction with respect to the transmission housing via at least one contour offset from a casting contour of the transmission housing.

In addition, it is possible that the second oil guide shell is attached directly to a centering plate of the vehicle transmission via preferably three bolt connections, the centering plate being a part of the housing-affixed oil supply system, and the second oil guide shell is also centered radially with respect to the centering plate.

A cooling oil return of a shift element (a friction-locking brake) is connectable via an axial de-oiling duct to a de-oiling opening in the second oil guide shell. The de-oiling duct branches off from the brake toward the oil guide shell at a 6 o'clock position in the circumferential direction of the brake. The oil to be guided out of the brake is then initially collected in the lower area of the brake and, from there, guided toward the oil guide shell with little complexity.

An inlet ramp is providable directly adjacent to the de-oiling opening of the second oil guide shell, the inlet ramp extending in the second oil guide shell in the direction of rotation of the rotor and of the sensor ring. During operation of the vehicle transmission according to the invention, the oil is then slung in the direction of rotation of the rotor and of the sensor ring against the inlet ramp and discharged from the hybrid space to the desired extent in the area of the inlet ramp. Via the inlet ramp, the amount of oil that is discharged from the hybrid space is further increased to the desired extent.

In another advantageous embodiment of the vehicle transmission according to the invention, oil from the cooling oil return of the brake is guided from the inlet ramp and from the rotating sensor ring toward the oil scraper of the oil discharge area of the second oil guide shell and toward the taper pump and, from there, to output-side windings of a stator of the electric machine.

The oil scraper of the oil discharge area of the second oil guide shell has at least two oil ejection openings, each of which includes an oil-scraping edge. Due to this particular design of the oil scraper, it is ensured that the brake is reproducibly de-oiled via the rotor of the electric machine or the sensor ring regardless of the rising oil level in the oil sump space.

The sensor ring, which is preferably cost-effectively manufactured by sheet-metal forming, has a reinforcing bead, by which a rigidity of the sensor ring is increased and rotational speed-induced deformations of the sensor ring are reduced.

A transmission ventilation takes place in another advantageous embodiment of the vehicle transmission according to the invention via at least one passage opening of the second oil guide shell toward an end face of the second oil guide shell, which faces the sensor ring.

A radial gap between the second oil guide shell and a rotor position sensor is sealable by an elastomeric seal.

Leakage flows from the oil sump space into the hybrid space are easily avoided via an elastomeric seal of this type. The elastomeric seal is placeable directly into the second oil guide shell or is a separate insertion seal.

In addition, it is possible that the oil guide shells are plastic injection molded parts. For example, the oil guide shells are made of PA6 or PA66 and are glass fiber-reinforced.

The invention is not limited to the specified combination of features of the independent claim or the claims dependent thereon. In addition, individual features can be combined with one another, provided they arise from the claims, the description of embodiments that follows, or directly from the drawing. References in the claims to the drawings via the use of reference characters is not intended to limit the scope of protection of the claims.

BRIEF DESCRIPTION OF THE DRAWINGS

Preferred refinements are found in the dependent claims and the following description. An exemplary embodiment of the invention is explained in greater detail with reference to the drawing, without being limited thereto, wherein:

FIG. 13 shows a side view of a first oil guide shell of the vehicle transmission according to FIG. 1;

FIG. 14 shows a sectional view of the first oil guide shell according to FIG. 13 taken along a cutting plane XIV-XIV in FIG. 13;

FIG. 15 shows a sectional view of the first oil guide shell according to FIG. 13 taken along a cutting plane XV-XV in FIG. 13;

FIG. 16 shows a rear view of the first oil guide shell of FIG. 13;

FIG. 18A shows a sectional view of the second oil guide shell according to FIG. 17 taken along a cutting plane XVIII-XVIII in FIG. 17;

FIG. 18B shows another sectional view of the second oil guide shell of the vehicle transmission according to FIG. 1, particularly illustrating an elastomeric seal of the second oil guide shell, the view corresponding to FIG. 18A;

DETAILED DESCRIPTION

Figure 1:
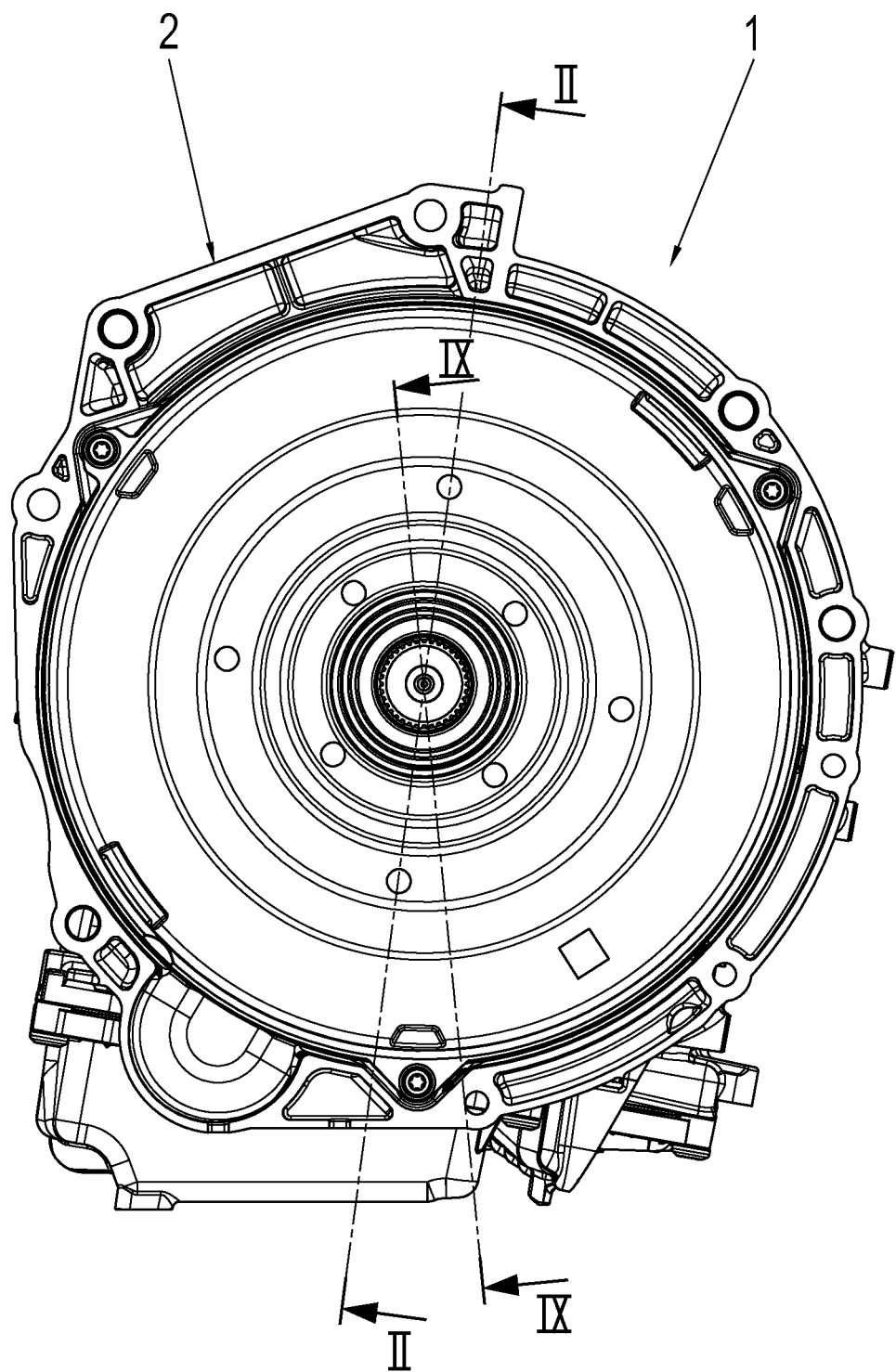
FIG. 1 shows a front view of a vehicle transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
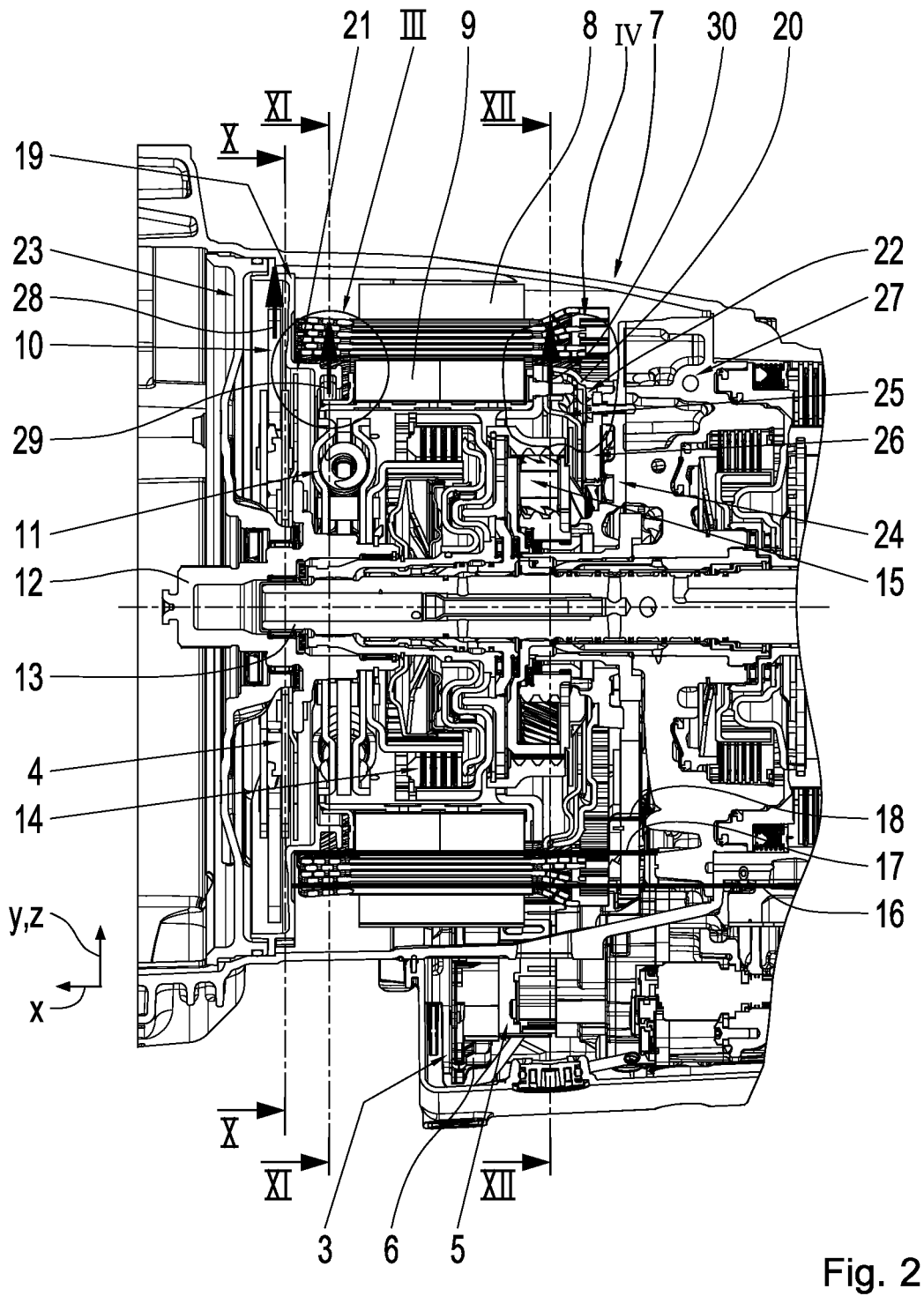
FIG. 2 shows a partial, detail longitudinal sectional view of the vehicle transmission according to FIG. 1 taken along a cutting plane II-II in FIG. 1.

FIG. 1 shows a front view of a vehicle transmission 1 that includes a transmission housing 2. In addition, FIG. 2 shows a partial longitudinal sectional view of the vehicle transmission 1 taken along a cutting plane II-II in FIG. 1. As shown in FIG. 2, the transmission housing 2 delimits an oil sump space 3 and a hybrid space 4. A rotationally drivable unit 5 is provided in the oil sump space 3. The rotationally drivable unit 5 is a transmission oil pump and is arranged in a housing 6 of the unit 5 and is partially shielded with respect to the oil sump space 3 by the housing 6. In an installed position of the vehicle transmission 1 in a vehicle, the hybrid space 4 is located above the oil sump space 3 in a vehicle vertical direction z. An electric machine 7 of the vehicle transmission 1, which is a so-called "hybrid transmission," includes a stator 8 and a rotor 9 provided in the hybrid space 4. In addition to the electric machine 7, a so-called "damper" 10 and a torsional shock absorber 11 are provided, as rotatory components, in the hybrid space 4.

The damper 10 is arranged on an input shaft 13 of the vehicle transmission 1 so as to be rotatable via a damper hub 12. The damper hub 12 is bringable into an operative connection with a prime mover, preferably an internal combustion engine. The damper hub 12 is connectable to the input shaft 13 in a rotationally fixed manner via a separating clutch 14. The separating clutch 14 is a friction-locking multi-disk clutch and arranged radially within the electric machine 7 in the hybrid space 4. In addition, a so-called "pre-ratio" 15 is provided between the input shaft 13 and the rotor 9 of the electric machine 7, the pre-ratio 15 being arranged between the input shaft 13 and the rotor 9 of the electric machine 7 for the purpose of increasing torque. The rotational speed of the rotor 9 is increased with respect to the rotational speed of the input shaft 13 by the pre-ratio 15.

During operation of the vehicle transmission 1, the transmission oil pump 5 suctions an oil flow out of the oil sump space 3 and delivers oil into an oil system of the vehicle transmission 1 in order to engage and disengage gear ratios of the vehicle transmission 1 and to supply components of the vehicle transmission 1 with cooling and lube oil. For this purpose, a defined oil volume is provided in the oil sump space 3, which, at room temperature, results in an oil level 16 in the oil sump space 3 and in the transmission housing 2. As the operating temperature of the vehicle transmission 1 and also of the transmission oil increases, the oil level 16 in the transmission housing 2 also increases, where higher oil levels are indicated in FIG. 2 by reference characters 17 and 18.

As is apparent from the representation according to FIG. 2, the rotating components in the hybrid space 4, i.e., the damper 10, the torsional shock absorber 11, and the rotor 9 of the electric machine 7, plunge into the oil volume in the transmission housing 2 when the oil level is in the range between the fill levels 17 and 18. The oil in the transmission housing 2 is then intensively churned and turbulently swirled up. In addition, due to the intensively turbulent oil-air flow in the hybrid space 4, the risk of oil leaking out of a transmission breather due to the swirling oil increases. Moreover, the churning by the rotating components 9, 10, 11 increases the portion of air in the oil in the oil sump space 3 and, due to arising shear losses, the oil temperature. This additionally intensifies the level increase and, thus, also increases the drag torques. This self-reinforcing effect is to be avoided in a structurally easy way due to the measures described in greater detail in the following.

In order to avoid an undesirably strong increase of the oil level in the oil sump space 3, the rotating components 9, 10, 11 in the hybrid space 4 are sealed off with respect to the remainder of the interior space of the transmission housing 2 and, thus, also with respect to the oil sump space 3, in the axial direction x and in the radial direction y by two housing-affixed oil guide shells 19, 20 (where the oil guide shells 19, 20 are fixed to the housing 2). The oil guide shells 19, 20 in the present case are simple plastic injection-molded parts and are made, for example, of PA6 or PA66 with glass fiber-reinforcement.

The sealing-off of the damper 10, the torsional shock absorber 11, and of the electric machine 7 (and its rotor 9) takes place contactlessly via gap seals 21, 22, each of which is formed or delimited by one of the oil guide shells 19 or 20, respectively, and a rotating component 9, 10, 11 arranged in the hybrid space 4.

The oil guide shell 19 encircles, radially and axially, the damper 10, the torsional shock absorber 11, and an area of the electric machine 7 (of the rotor 9 facing the damper 10). As a result, the first oil guide shell 19 seals off these components with respect to the oil volume in the transmission housing 2, which is static or is increasing with the operating temperature of the oil. In addition, the first oil guide shell 19 is arranged directly in the transmission housing 2 and axially between the transmission housing 2 and a bearing shield 23 and is axially guided there. In addition, the oil guide shell 19 is centered radially in the transmission housing 2 and aligned or angularly aligned in the circumferential direction with respect to the transmission housing 2 via targeted contour offsets from the casting contour of the transmission housing 2.

The second oil guide shell 20 is attached directly to a centering plate 24 via preferably three bolt connections and is also centered radially with respect to the centering plate 24. The centering plate 24 is a part of the housing-affixed oil supply system.

A sensor ring 25 is mounted at the rotor 9 of the electric machine 7, the sensor ring 25 interacting with a rotor position sensor 26 in order to be able to ascertain a current rotation position of the rotor 9 of the electric machine 7. An intermediate plate 27 of the vehicle transmission 1, which is also part of the oil supply system of the vehicle transmission 1, adjoins the centering plate 24 in an axial direction x of the vehicle transmission 1 on the side of the centering plate 24 facing away from the hybrid space 4.

Since the hybrid space 4 is not completely sealed via the two gap seals 21 and 22 with respect to an entry of leakage oil from the oil sump space 3 and, additionally, as oil is introduced into the hybrid space 4 for cooling and lubrication via the input shaft 13, the first oil guide shell 19 has two so-called "oil ejectors" 28, 29 and the second oil guide shell 20 has one "oil ejector" 30. The first oil ejector 28 of the first oil guide shell 19 is provided radially outside the damper 10, while the second oil ejector 29 of the first oil guide shell 19 is arranged directly next to a laminated core of the rotor 9.

The gap widths of the gap seals 21, 22 between the oil guide shells 19 and 20 and the damper 10, the torsional shock absorber 11, and the rotor 9 are as small as possible in order to achieve the smallest possible leakage oil flows out of the oil sump space 3 toward the rotating components in the hybrid space 4. It is ensured that the oil guide shells 19, 20 and the rotating components 9, 10, 11 do not come into contact with one another during operation of the vehicle transmission 1. Preferably, the axial and the radial nominal distances between the oil guide shells 19, 20 and the damper 10 as well as between the oil guide shells 19, 20 and the torsional shock absorber 11, and also between the oil guide shells 19, 20 and the rotor 9, are from 1 mm to 3 mm.

Figure 3:
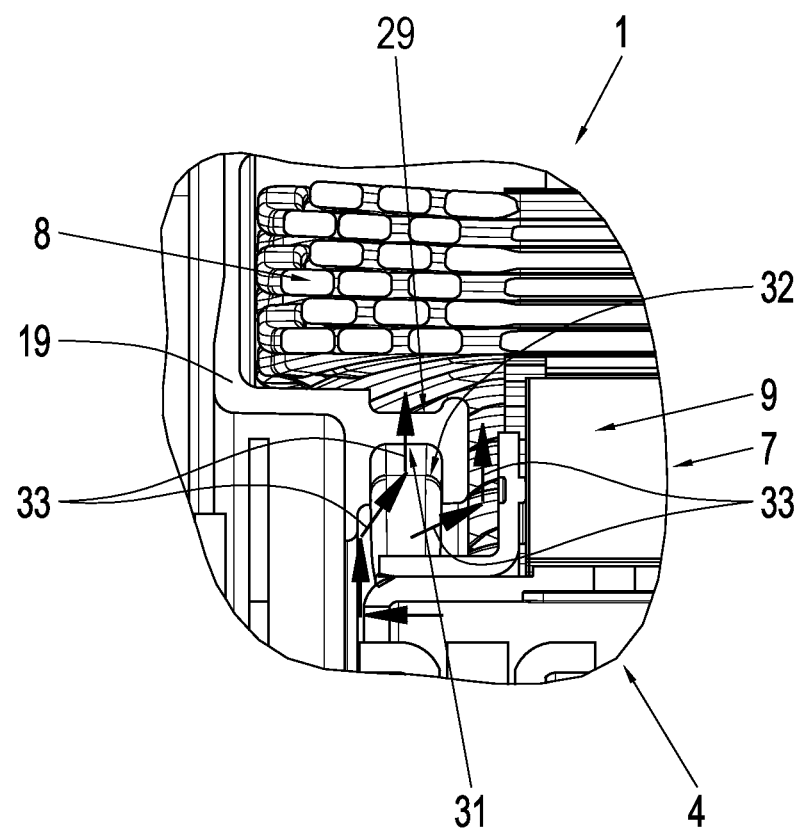
FIG. 3 shows an enlarged detail view of an area III of the vehicle transmission according to FIG. 1, the area III being taken with respect to FIG. 2.

FIG. 3 shows an enlarged view of an area III from FIG. 2 and in which the second oil ejector 29 of the first oil guide shell 19 is provided. The second oil ejector 29 of the first oil guide shell 19 has an oil scraper 31 that includes a sharp oil-scraping edge 32. Via the second oil ejector 29 of the first oil guide shell 19, the oil flows during the operation of the vehicle transmission 1 out of the hybrid space 4 toward an input-side winding of the stator 8 due to the rotation of the rotor 9 of the electric machine 7. The stator 8 of the electric machine 7 is acted upon and cooled by the oil, the flow direction of which in the area of the second oil ejector 29 is indicated by the flow arrows 33.

Figure 4:
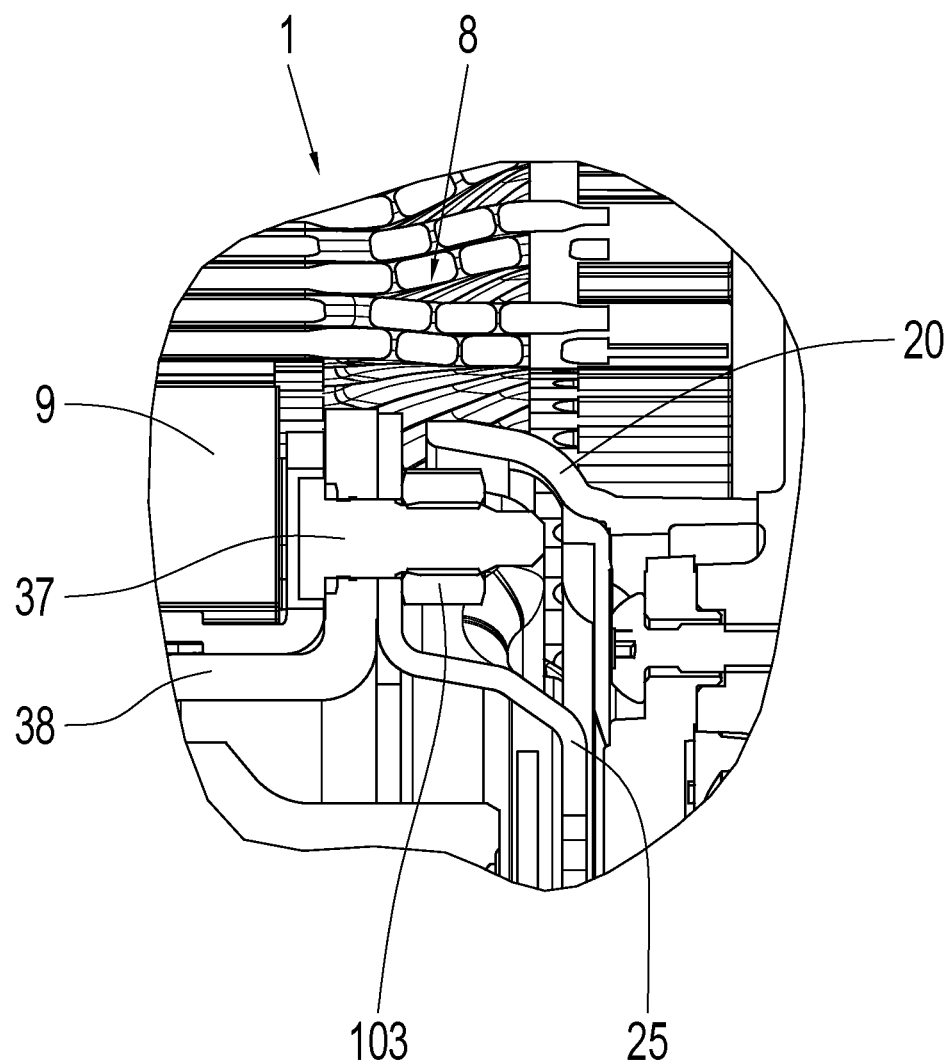
FIG. 4 shows an enlarged view of an area IV of the vehicle transmission according to FIG. 1, the area IV being taken with respect to FIG. 2.
Figure 5:
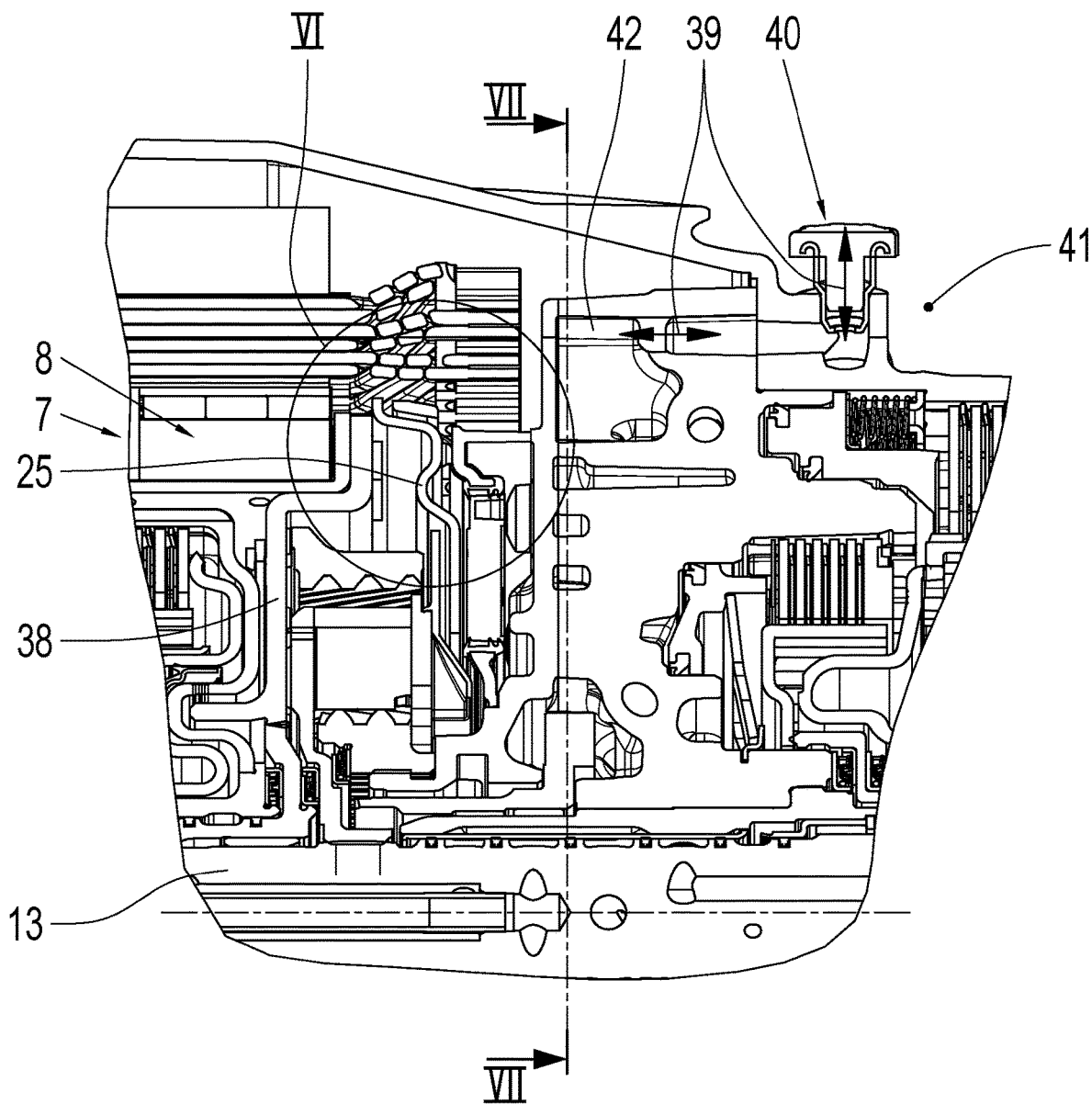
FIG. 5 shows a partial longitudinal sectional view of the vehicle transmission according to FIG. 1 taken along a cutting plane V-V in FIG. 7.
Figure 6:
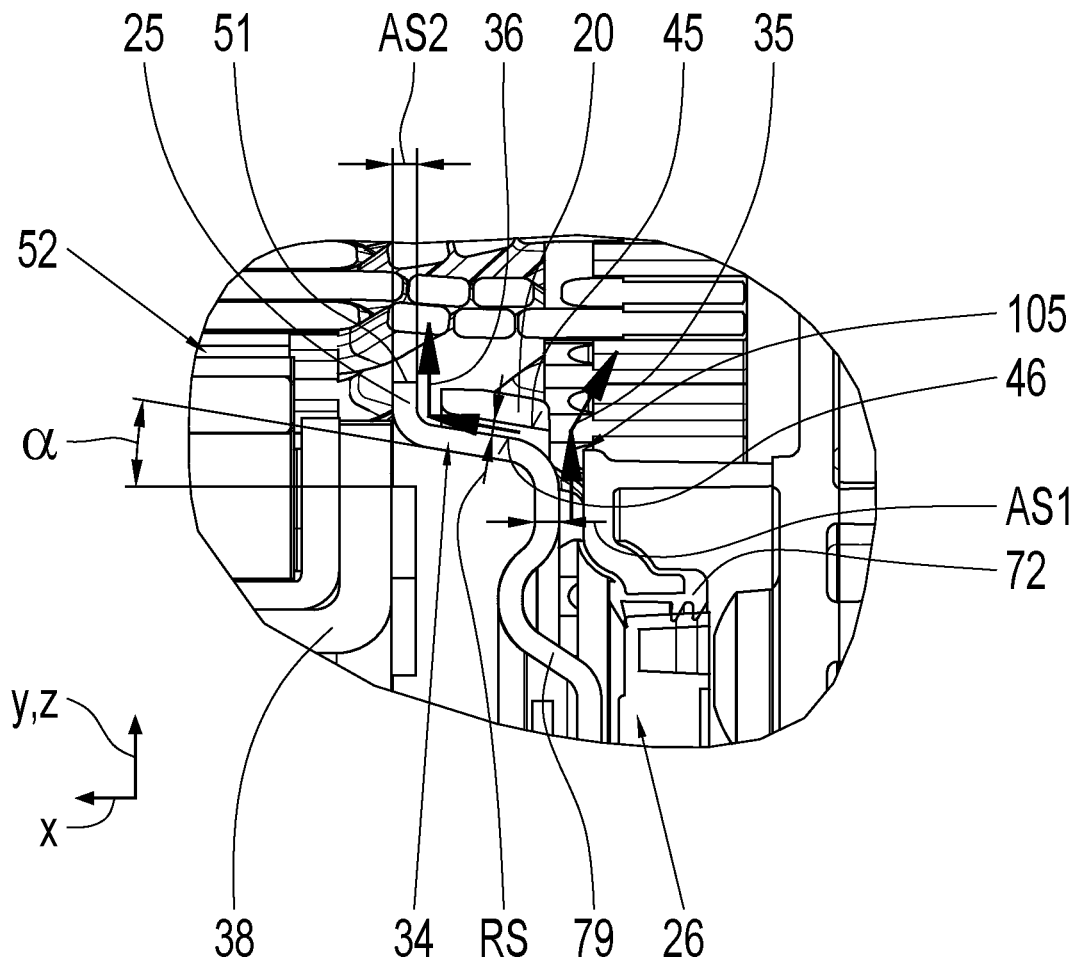
FIG. 6 shows an enlarged view of an area VI of the vehicle transmission according to FIG. 1, the area VI being taken with respect to FIG. 5.

Moreover, FIG. 4 shows an enlarged view of an area IV in FIG. 2, where, as is represented in greater detail in FIG. 5 and FIG. 6, the area IV includes, in addition to the oil ejector 30 of the second oil guide shell 20, a taper pump 34. As particularly shown in FIG. 6, the taper pump 34 of the second oil guide shell 20 is formed by a tapered inner surface 45 of the second oil guide shell 20 and a tapered outer surface 46 of the sensor ring 25 oriented in parallel thereto. The oil ejector 30 is arranged directly next to the taper pump 34 in an axial direction x. The oil that is discharged from the hybrid space 4 via the oil ejector 30 of the second oil guide shell 20 flows, due to the rotation of the sensor ring 25, radially outward in the radial direction y according to the flow arrows 35 and through the taper pump 34 toward output-side windings of the stator 8 according to the flow arrow 36. In addition, it is apparent from FIG. 4 that the sensor ring 25 is attached at the rotor 9 of the electric machine 7 via a so-called "stay bolt" 37. The stay bolt 37 extends through a rotor carrier 38 of the rotor 9 and also the sensor ring 25 in an axial direction x. A nut 103 is screwed down onto the stay bolt 37 in order to connect the rotor carrier 38 and the sensor ring 25 to each other in a rotationally fixed manner to a desired extent.

Figure 7:
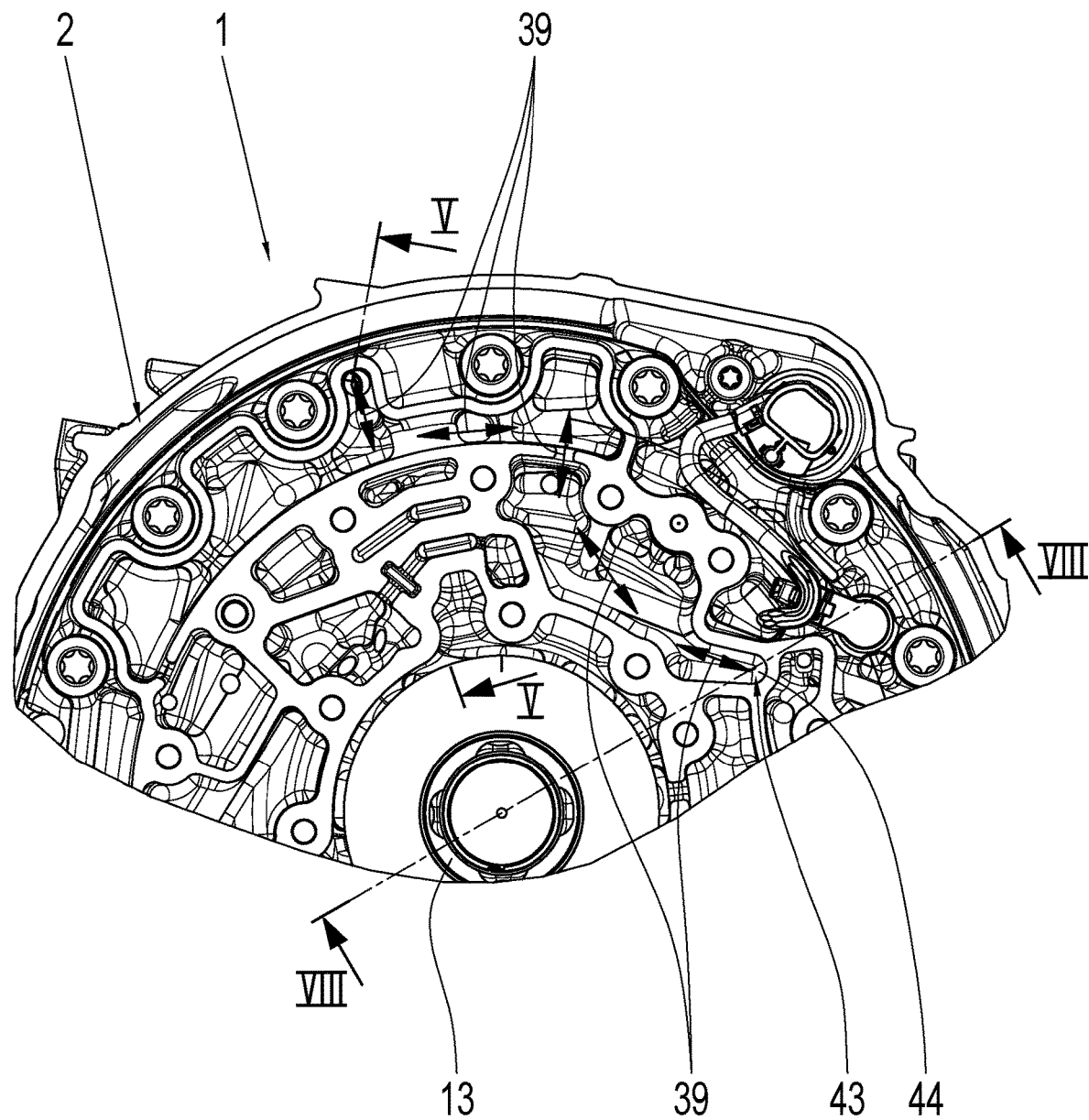
FIG. 7 shows a partial longitudinal sectional view of the vehicle transmission according to FIG. 1 taken along a cutting plane VII-VII in FIG. 5.

FIG. 5 shows a partial longitudinal sectional view of the vehicle transmission 1 taken along a section line V-V in FIG. 7. FIG. 6 shows an enlarged view of an area VI from FIG. 5. In addition, FIG. 7 shows a partial cross-sectional view of the vehicle transmission 1 taken along a cutting plane VII-VII in FIG. 5. A flow path 39 of the transmission ventilation of the vehicle transmission 1 is shown in the representations according to FIG. 5 and FIG. 7. A transmission breather 40 is also shown in FIG. 5, via which the interior space of the transmission housing 2 is connected to the surroundings 41 of the vehicle transmission 1. The transmission breather 40 is connected via a vent duct 42 to an area 43 (FIG. 7) of a vent hole 44 (FIG. 7) of the second oil guide shell 20.

Figure 8:
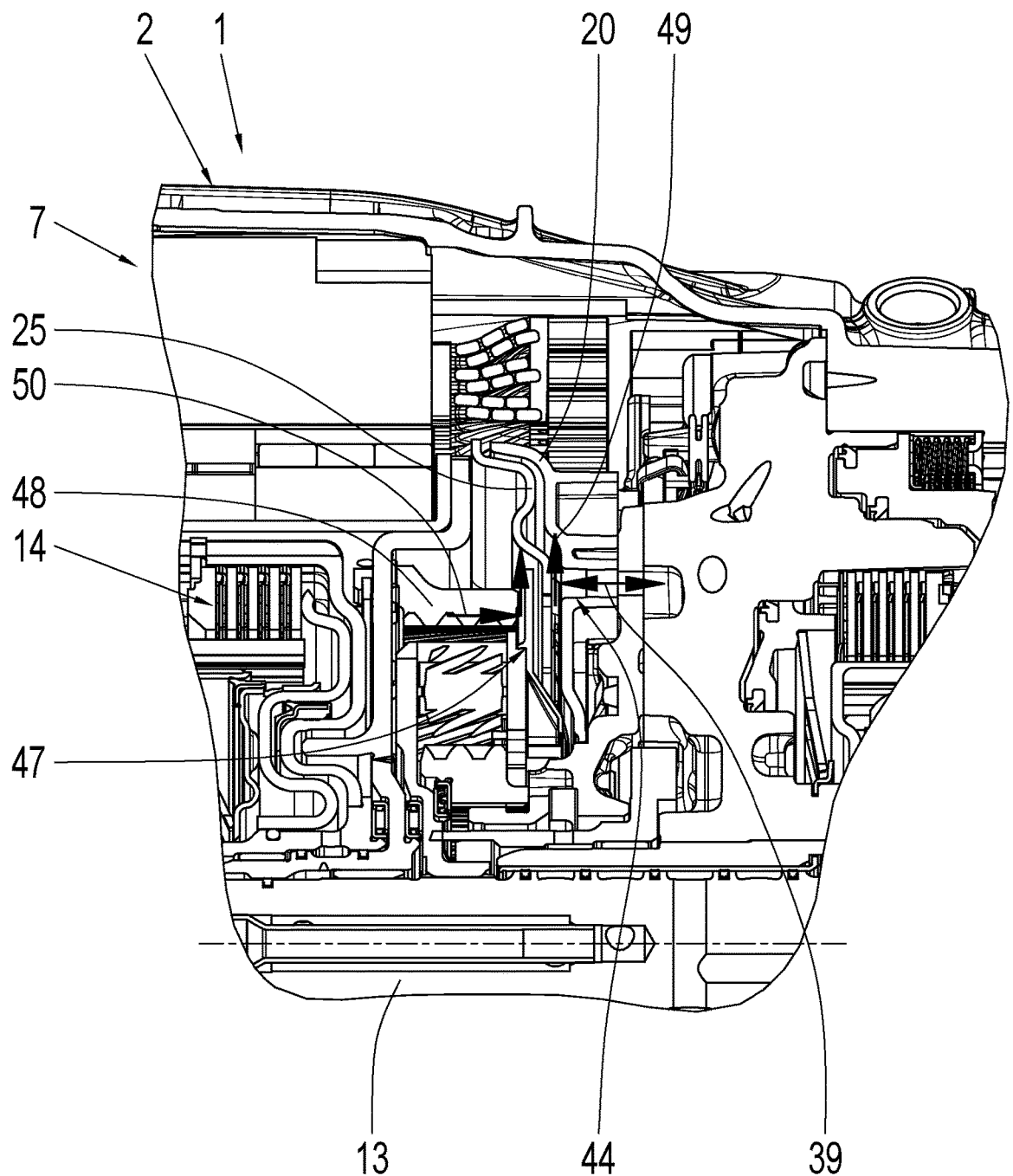
FIG. 8 shows a partial cross-sectional view of the vehicle transmission according to FIG. 1 taken along a cutting plane VIII-VIII in FIG. 7.

The vent hole 44 is shown in greater detail in FIG. 8 in which a transmission section through the vehicle transmission 1 taken along a cutting plane VIII-VIII in FIG. 7 is shown. In addition, a radially outward extended oil collecting tray 47 is shown in FIG. 8. The oil collecting tray 47 is part of the pre-ratio 15 and is provided as a splash guard for sealing off the vent hole 44 of the transmission ventilation. The oil collecting tray 47 adjoins a ring gear 48 of the pre-ratio 15 in an axial direction x. A radial oil flow direction toward the outside caused by the rotation of the sensor ring 25 is indicated by the flow arrows 49 in FIG. 8. In addition, the flow arrow 50 indicates the flow direction of oil spray that is sprayed by the pre-ratio 15.

Referring back to FIG. 6, axial gap widths AS1, AS2 between the sensor ring 25 and the second oil guide shell 20 are preferably in the nominal size range from 1 mm to 3 mm. After subtracting all component tolerances, an axial minimum gap of approximately 0.5 mm then preferably sets in during operation of the vehicle transmission 1. Moreover, a radial gap width RS between the sensor ring 25 and the second oil guide shell 20 in the area of the taper pump 34 is preferably in the nominal size range between 0.5 mm and 1.5 mm. A radial minimum gap of approximately 0.2 mm then sets in during operation of the vehicle transmission 1 after subtracting all component tolerances.

The taper angle $\alpha$ (FIG. 6) of the taper pump 34 has values between 5° and 30° with respect to the axial direction x of the vehicle transmission 1 in order to achieve a certain sealing gap length in addition to the radial removal and suction effect. Due to the taper gap angle $\alpha$ of the taper pump 34, a preferred flow is generated outward in the radial direction y during the rotation of the rotor 9 and the sensor ring 25 attached at the rotor 9. As a result, oil is conveyed out of the hybrid space 4 via the taper pump 34 and an oil volume in the hybrid space 4, which is present due to leakage oil from the oil sump space 3 and due to the introduction of cooling and lube oil into the hybrid space 4, is reduced with little structural complexity.

In addition, a radially outward drawn shoulder 51 is provided as an oil guide contour at the sensor ring 25. The shoulder 51 has the particular purpose of directing the oil that is conveyed out of the taper pump 34 in a targeted manner radially outward toward the output-side windings of the stator 8 of the electric machine 7 and cooling these windings circumferentially over 360°.

Simultaneously, the oil outflow from the taper pump 34, which is directed radially outward via the shoulder 51, protects the air gap 52 between the rotor 9 and the stator 8 against oil flooding, the air gap 52 being adjacent to the input side. Therefore, the radially outward drawn shoulder 51 is used as an oil guide contour of the taper pump 34 for avoiding drag torque in the air gap 52 of the electric machine 7 and for the targeted cooling of the stator 8 of the electric machine 7.

An oil scraper 105 of the oil ejector 30 of the second oil guide shell 20 is provided directly next to the taper pump 34. The oil scraper 105 is provided at a 10 o'clock position in the direction of rotation of the rotor 9 and circumferentially in the second oil guide shell 20 in order to further improve the de-oiling of the hybrid space 4.

Figure 9:
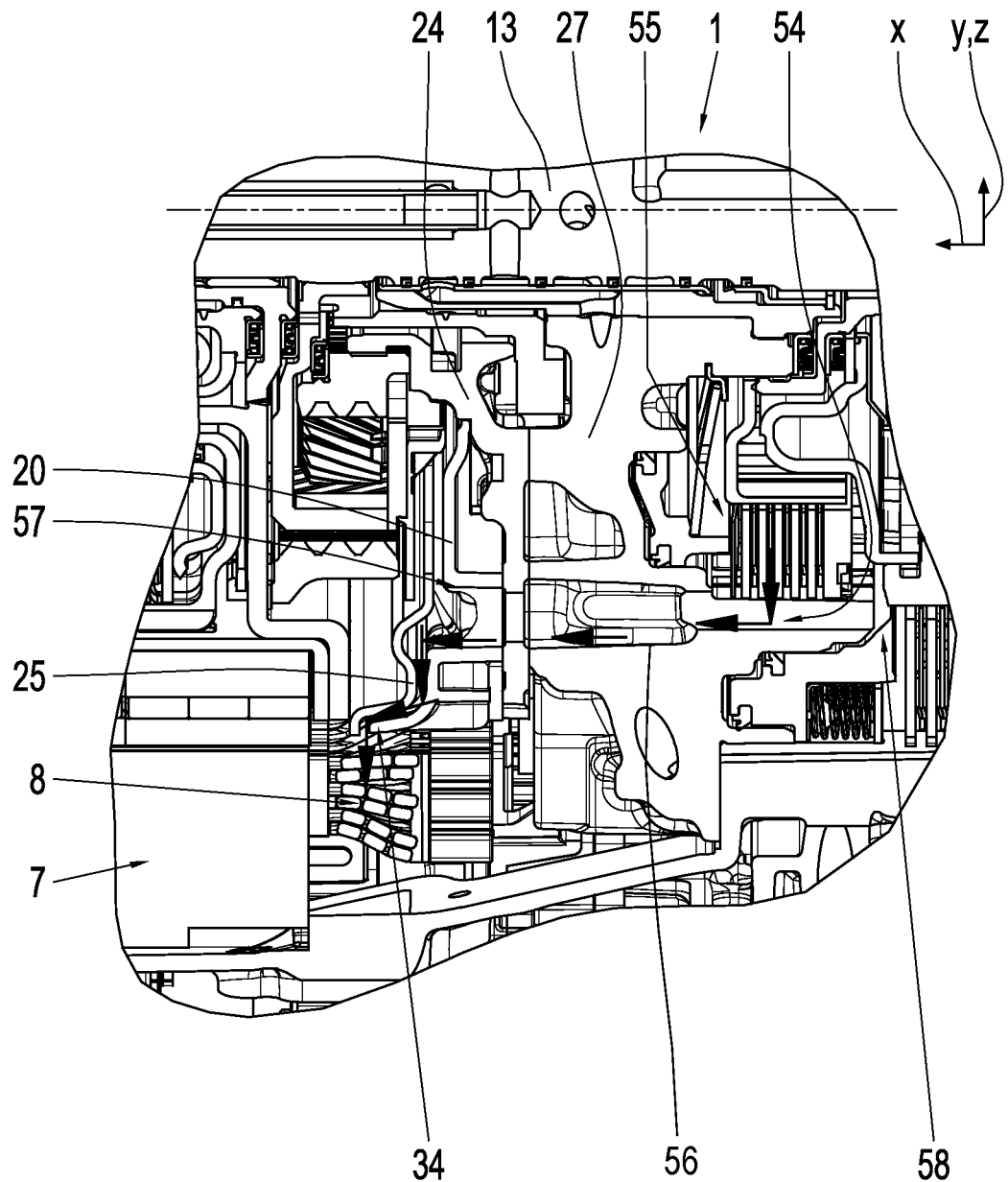
FIG. 9 shows a partial longitudinal sectional view of the vehicle transmission according to FIG. 1 taken along a cutting plane IX-IX in FIG. 1.

FIG. 9 shows a cross-sectional view of the vehicle transmission 1 taken along a cutting plane IX-IX in FIG. 1. A cooling oil return 54 of a shift element 55 of the vehicle transmission 1, the shift element 55 being a multi-disk brake, is connected to a de-oiling opening 57 of the second oil guide shell 20 via a de-oiling duct 56 extending in an axial direction x in the transmission housing 2. The de-oiling duct 56 is provided in the intermediate plate 27, which is adjacent to a so-called "baffle plate" 58, by which the oil flow from the cooling oil return 54 of the shift element 55 is directed toward the sensor ring 25. Downstream from the de-oiling opening 57, the oil flows out of the shift element 55 due to the rotation of the sensor ring 25 radially outward and, there, impacts the output-side winding of the stator 8 of the electric machine 7, which is wetted and cooled by the oil.

Figure 10:
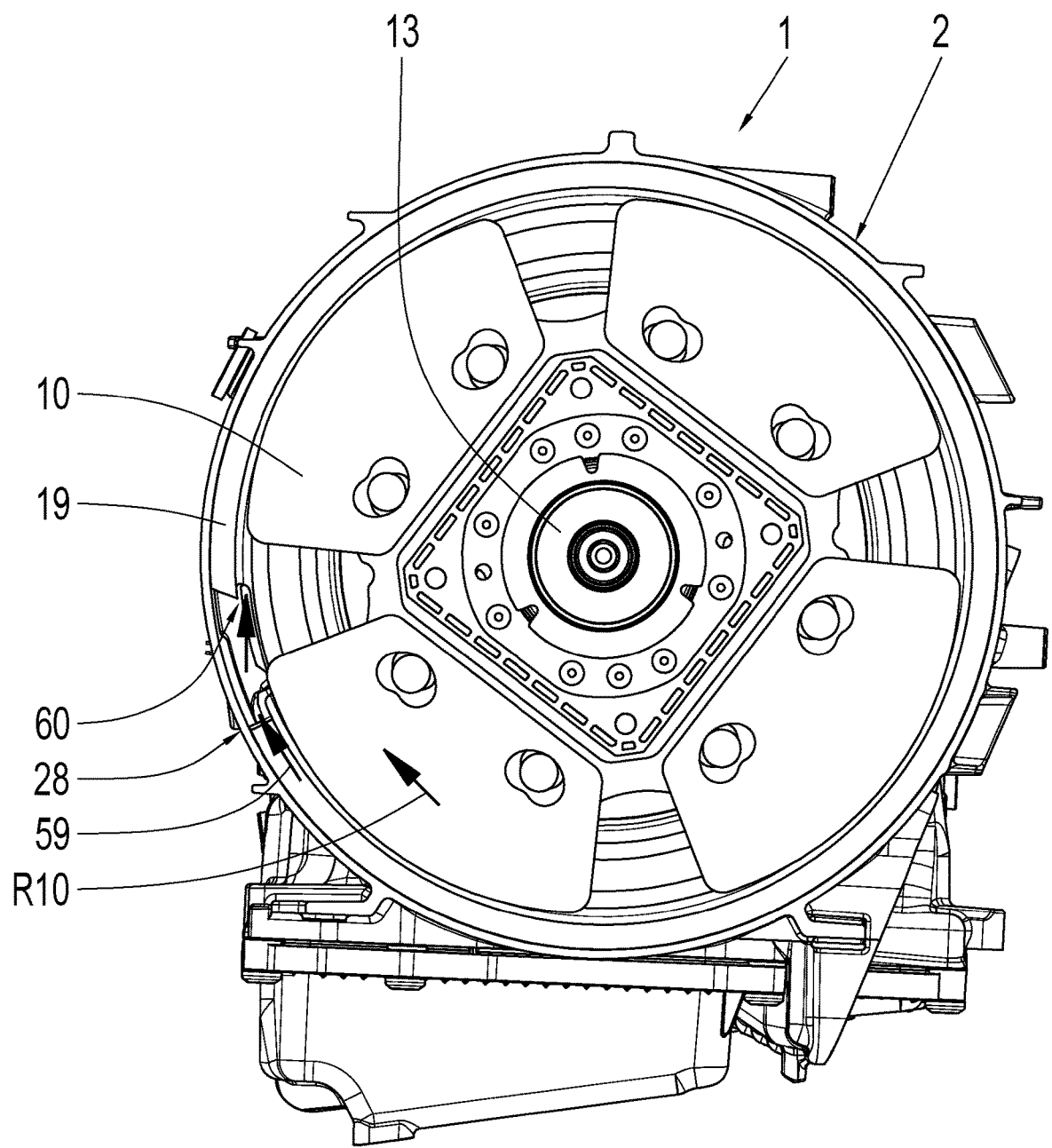
FIG. 10 shows a cross-sectional view of the vehicle transmission according to FIG. 1 taken along a cutting plane X-X in FIG. 2.

FIG. 10 shows a cross-sectional view of the vehicle transmission 1 taken along a cutting plane X-X in FIG. 2, which extends through the area in which the first oil ejector or the first oil discharge area 28 of the first oil guide shell 19 is arranged. It is apparent from the representation according to FIG. 10 that the first oil ejector 28 of the first oil guide shell 19 is provided in an 8 o'clock position in the circumferential direction of the vehicle transmission 1. A rotation direction R10 of the damper 10 is in the clockwise direction in the present exemplary embodiment. Due to the rotation direction R10 of the damper 10, when the oil level is appropriately high, the oil present in the hybrid space 4 is carried by the rotating damper 10 in the flow direction 59 and, thus, in the direction of the first oil discharge area 28 of the first oil guide shell 19. The oil carried along by the damper 10 is discharged from the hybrid space 4 via an oil ejection opening 60 through the first oil guide shell 19 provided on the outside. As a result, the oil level in the hybrid space 4 is reduced in a desired way and the aforementioned disadvantages of the prior art, i.e., a churning of oil, undesirable drag torques, and a heating of the oil caused by the churning, are easily avoided.

Figure 11:
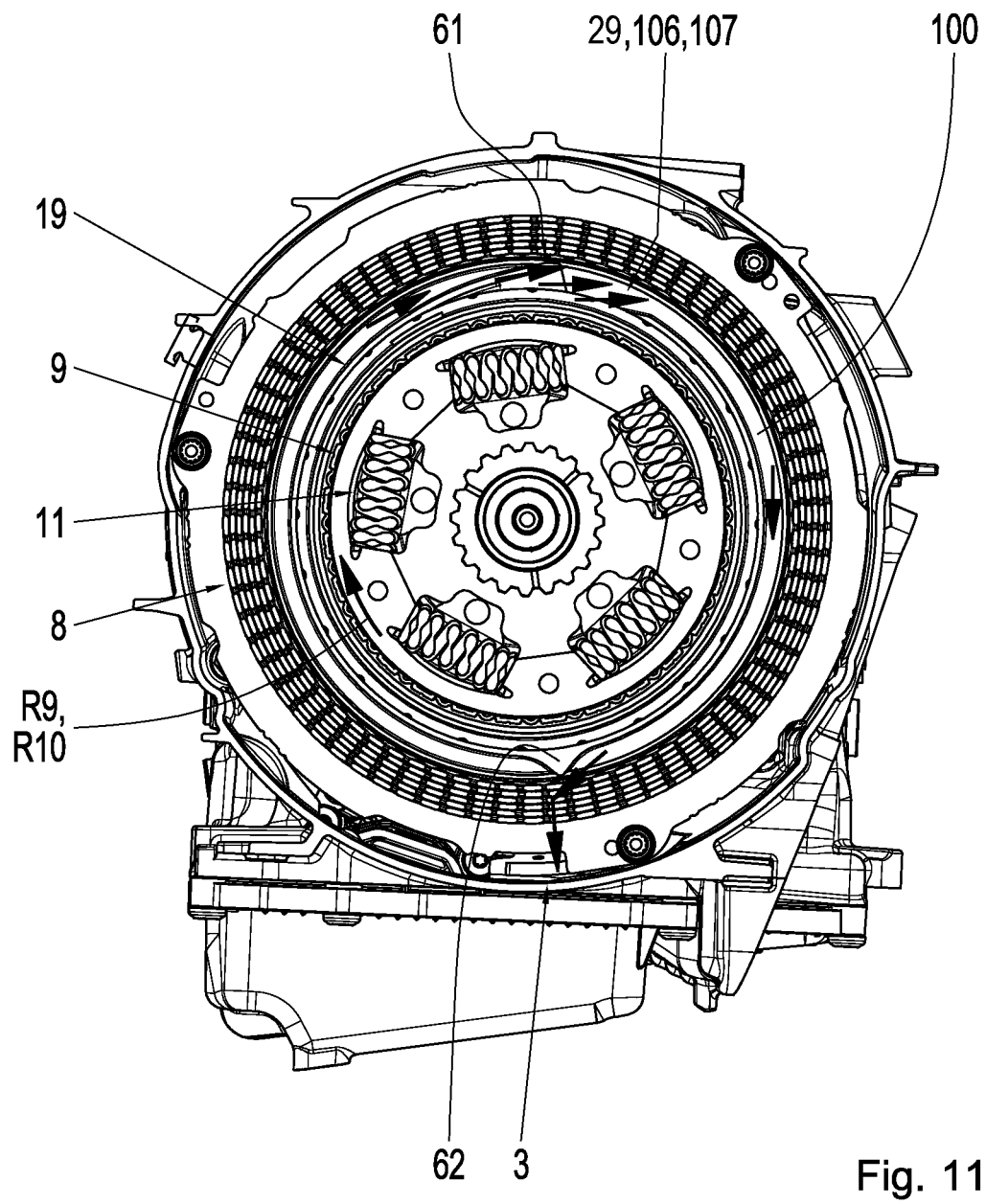
FIG. 11 shows a cross-sectional view of the vehicle transmission according to FIG. 1 taken along a cutting plane XI-XI in FIG. 2.

In addition, FIG. 11 shows a cross-sectional view of the vehicle transmission 1 according to FIG. 1 along a cutting plane XI-XI characterized in greater detail in FIG. 2. FIG. 11 shows the cross-section of the vehicle transmission 1, in which the second oil discharge area 29 of the first oil guide shell 19 is provided. The second oil discharge area or the second oil ejector 29 of the first oil guide shell 19 is provided on the peripheral side of the vehicle transmission 1 at a 1 o'clock position and is an oil scraper 106 that includes a sharp oil-scraping edge 107. Due to the rotation of the rotor 9 in the direction R9 and of the torsional shock absorber 11 (in the same direction as the direction R10), oil in the hybrid space 4 is pressed in the circumferential direction of the first oil guide shell 19 along the oil guide shell 19 and discharged from the hybrid space 4 via an oil ejection opening 61 through the first oil guide shell 19. On the side facing away from the hybrid space 4, the first oil guide shell 19 is formed with an oil drainage channel 100 having a U-shaped cross-section, in which the oil discharged from the hybrid space 4 through the oil ejection opening 61 of the second oil ejector 29 is collected and guided in the circumferential direction down toward an oil drainage wedge 62. From the oil drainage wedge 62, the oil flows outside the hybrid space 4 toward the oil sump space 3.

Figure 12A:
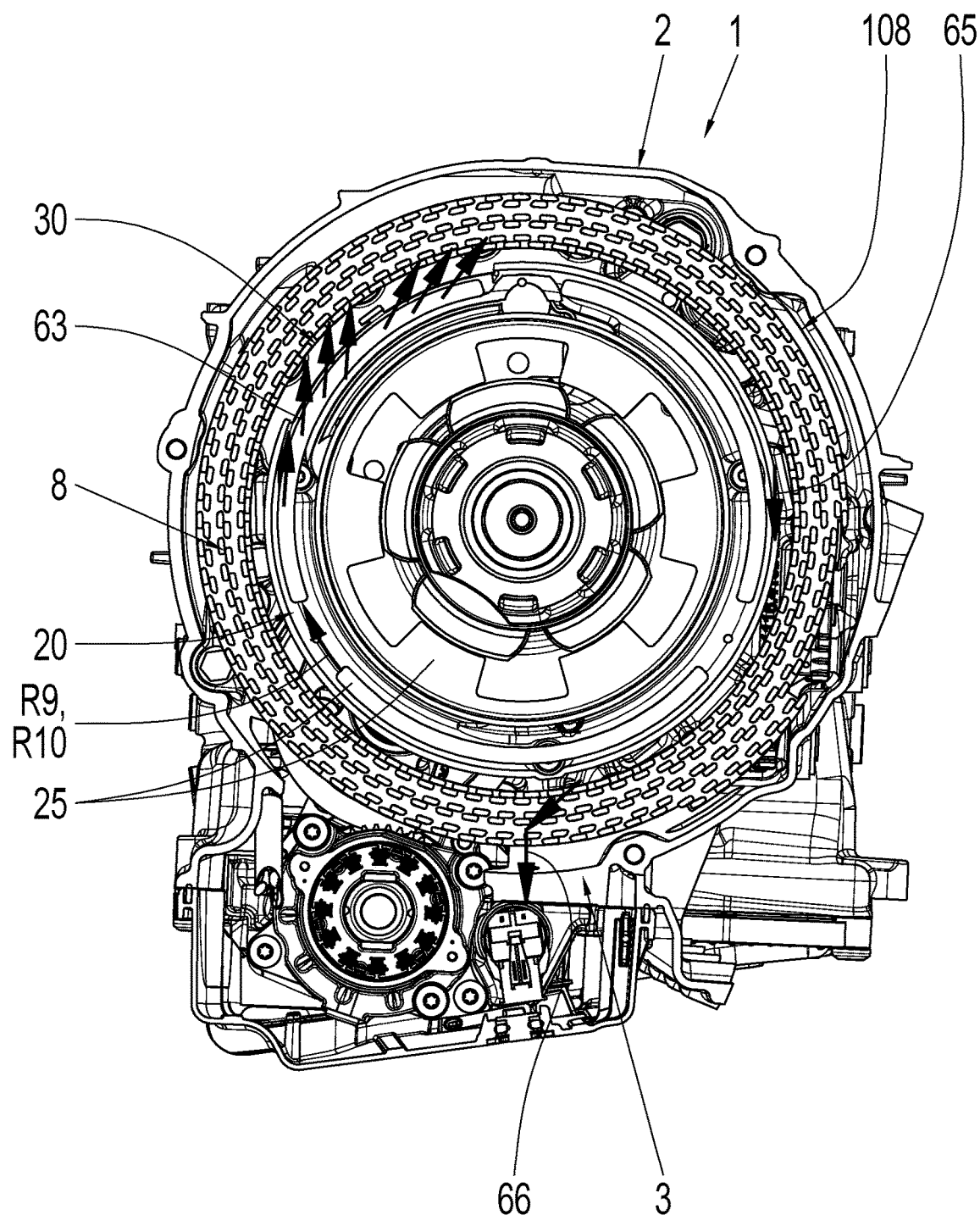
FIG. 12A shows a cross-sectional view of the vehicle transmission according to FIG. 1 taken along a cutting plane XII-XII in FIG. 2.

FIG. 12A shows a cross-sectional view of the vehicle transmission 1 according to FIG. 1 taken along a cutting plane XII-XII in FIG. 2. The cutting plane XII-XII extends through the cross-sectional area of the vehicle transmission 1, in which the oil ejector 30 of the second oil guide shell 20 is provided. It is apparent from the representation according to FIG. 12A that the oil ejector 30 or the oil discharge area of the second oil guide shell 20 is provided in the circumferential direction of the vehicle transmission 1 at a 10 o'clock position and on an output side of the rotor 9. Given an appropriately high oil level in the oil sump space 3, the rotor 9 carries oil in the rotation direction R9 and in the circumferential direction of the hybrid space 4 from a lower area of the hybrid space 4 in the direction of the oil ejector 30 of the second oil guide shell 20. Due to the rotation of the rotor 9, oil carried from the lower area of the hybrid space 4 is pressed along the second oil guide shell 20 toward the oil ejector 30 and, there, is discharged from the hybrid space 4 via an oil discharge opening 63 through the second oil guide shell 20. A radial gap 108 between the second oil guide shell 20 and windings of the stator 8 of the electric machine 7 acts as an oil drainage toward the oil sump space 3. The flow direction of the oil is indicated in FIG. 12A by a flow arrow 65. The oil draining in the flow direction 65 outside the hybrid space 4 is therefore deflected in a lower area of the transmission housing 2 toward the oil sump or the oil sump space 3 according to the arrow 66 and flows into the oil sump space 3.

Figure 12B:
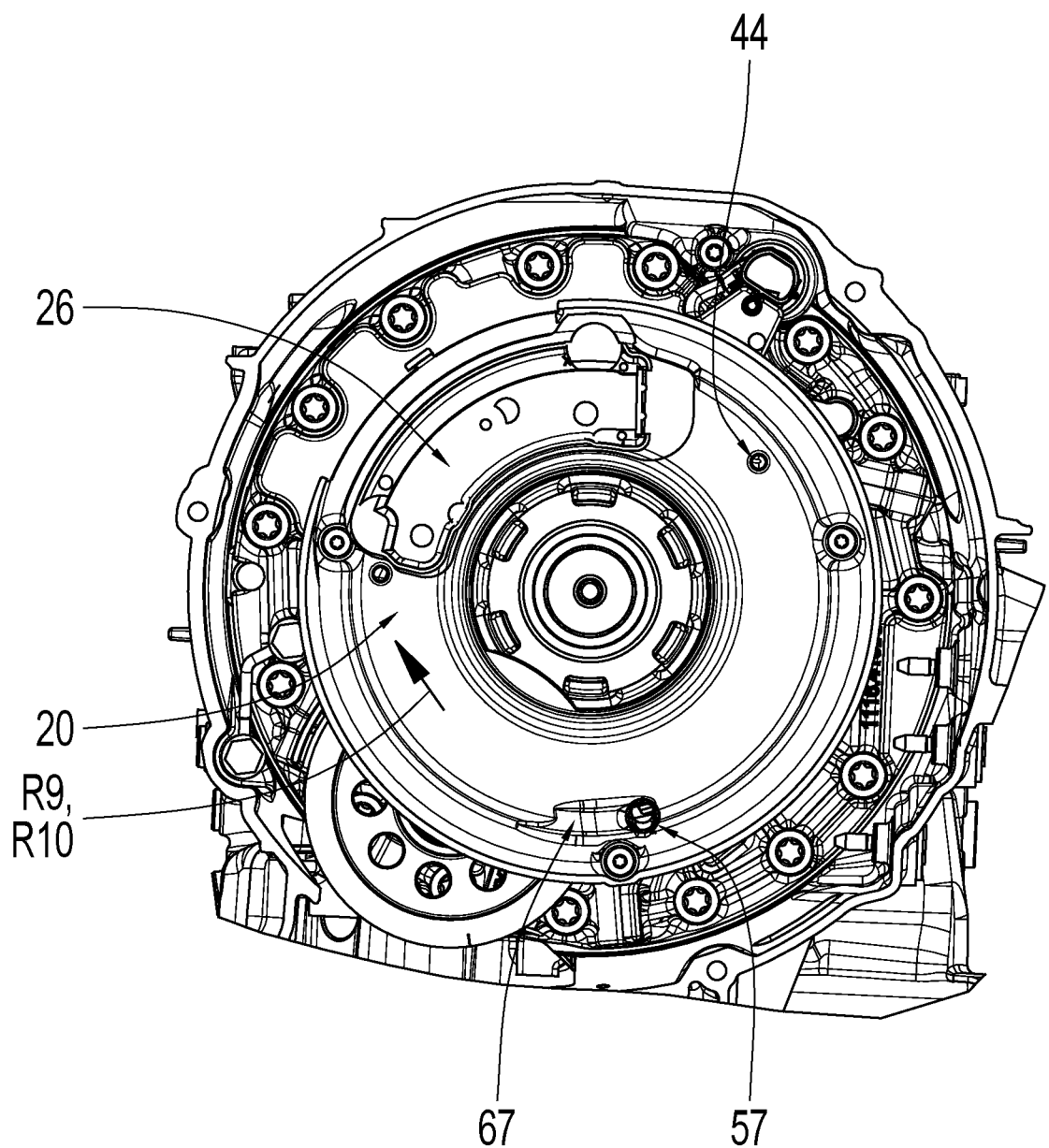
FIG. 12B shows a representation of the vehicle transmission according to FIG. 1, which essentially corresponds to FIG. 12A and is simplified in comparison to FIG. 12A.

FIG. 12B shows a further representation of the vehicle transmission 1 that essentially corresponds to FIG. 12A without the electric machine 7. In FIG. 12B, a ventilation opening or the vent hole 44 of the second oil guide shell 20 and the de-oiling opening 57, in addition to the rotor position sensor 26, are shown. In addition, an inlet ramp 67 is indicated in FIG. 12B, which extends in the rotation direction R9 of the rotor 9 and interacts with the de-oiling opening 57. Via the inlet ramp 67, the cooling oil, which is guided from the shift element 55 via the de-oiling duct 56 (FIG. 9) through the de-oiling opening 57 (FIG. 9) of the second oil guide shell 20, is carried along by the rotating sensor ring 25 (FIG. 9) in the most efficient and resistance-free manner possible. The oil is then guided via the oil scraper 105 (FIG. 6) of the oil ejector 30 of the second oil guide shell 20 and via the taper pump 34 (FIG. 6) out of the hybrid space 4 and to the output-side windings of the stator 8 of the electric machine 7 (FIG. 9).

FIG. 13 shows the first oil guide shell 19 in a side view and alone. The outer diameter of the oil guide shell 19 is a centering diameter with respect to the transmission housing 2. In addition, FIG. 14 shows a sectional view of the first oil guide shell 19 taken along a cutting plane XIV-XIV in FIG. 13. Moreover, FIG. 15 shows a sectional view of the oil guide shell 19 taken along a cutting plane XV-XV in FIG. 13. In addition, FIG. 16 shows a section through the oil guide shell 19 taken along a cutting plane XVI-XVI in FIG. 14, which extends through the U-shaped oil drainage channel 100. FIG. 16 also shows, in addition to the first oil ejector 28, the second oil ejector 29 of the oil guide shell 19 and a contour offset 68 from the transmission housing 2. The contour offset 68 is provided for the angular alignment of the oil guide shell 19 with respect to the transmission housing 2.

Figure 17:
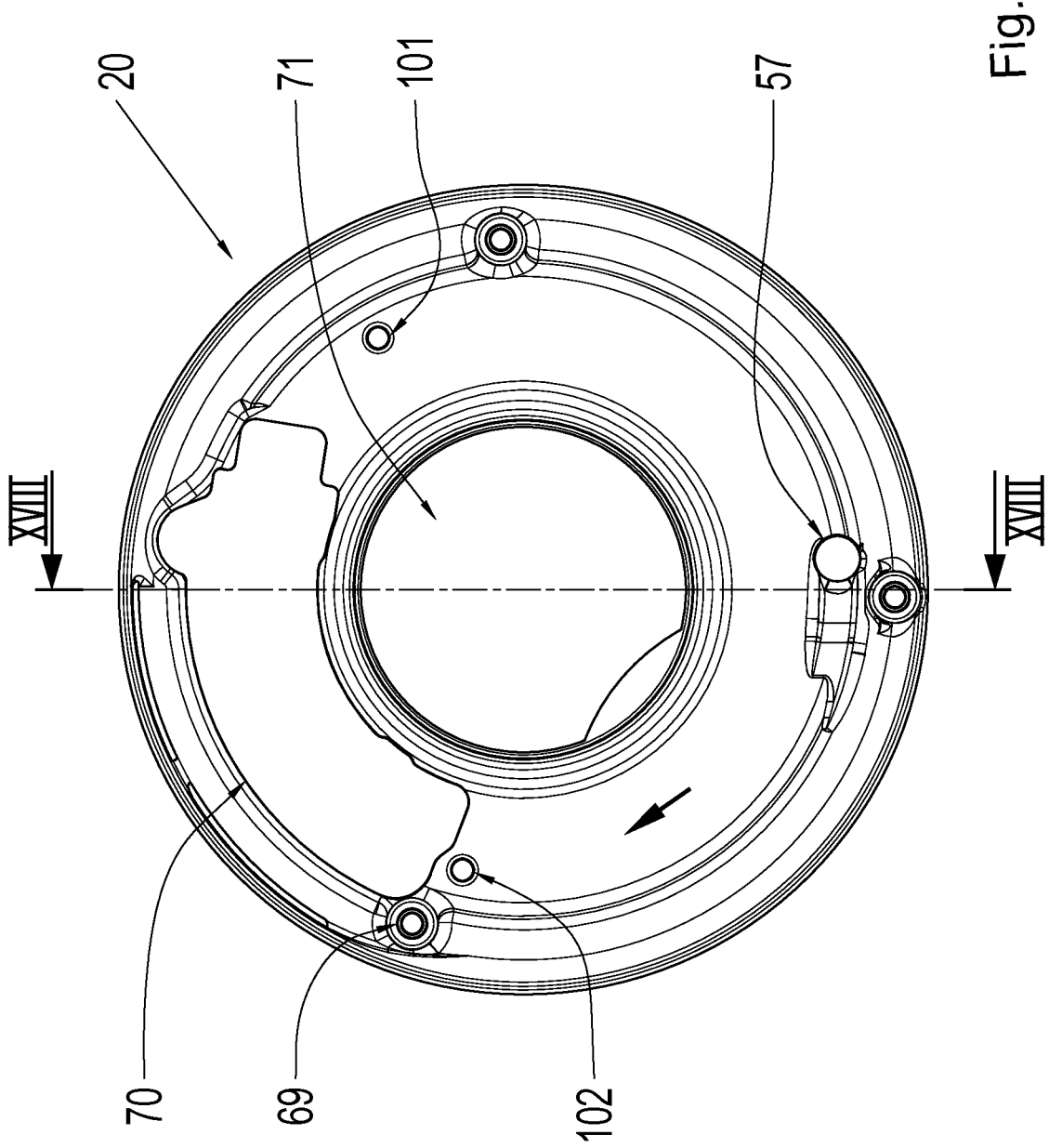
FIG. 17 shows a side view of a second oil guide shell of the vehicle transmission according to FIG. 1, the side view corresponding to FIG. 13.

The second oil guide shell 20 is represented in a side view in FIG. 17 and includes a recess 70 in addition to bolting-on points 69, in the area of which the second oil guide shell 20 is boltable onto the centering plate 24. Via the recess 70, the rotor position sensor 26 (FIG. 2) scans the turning motion of the sensor ring 25 (FIG. 2). In the exemplary embodiment shown, the rotor position sensor 26 protrudes axially through the oil guide shell 20 in order to directly detect the turning motion of the sensor ring 25. An inner diameter of an opening 71 of the second oil guide shell 20 acts as a centering diameter at the centering plate 24.

FIG. 18A shows a sectional view of the second oil guide shell 20 taken along a cutting plane XVIII-XVIII in FIG. 17. FIG. 18B shows the same sectional view of the second oil guide shell 20, except that an optional gap seal is additionally provided between the second oil guide shell 20 and the rotor position sensor 26. The gap seal is an elastomeric seal 72 mounted at the second oil guide shell 20.

Via the elastomeric seal 72, which seals the radial gap between the second oil guide shell 20 and the rotor position sensor 26, leakage oil flows from the oil sump space 3 into the hybrid space 4 are avoided in this area. The elastomeric seal 72 is placeable directly into the second oil guide shell 20 or is a separate insertion seal.

Figure 19:
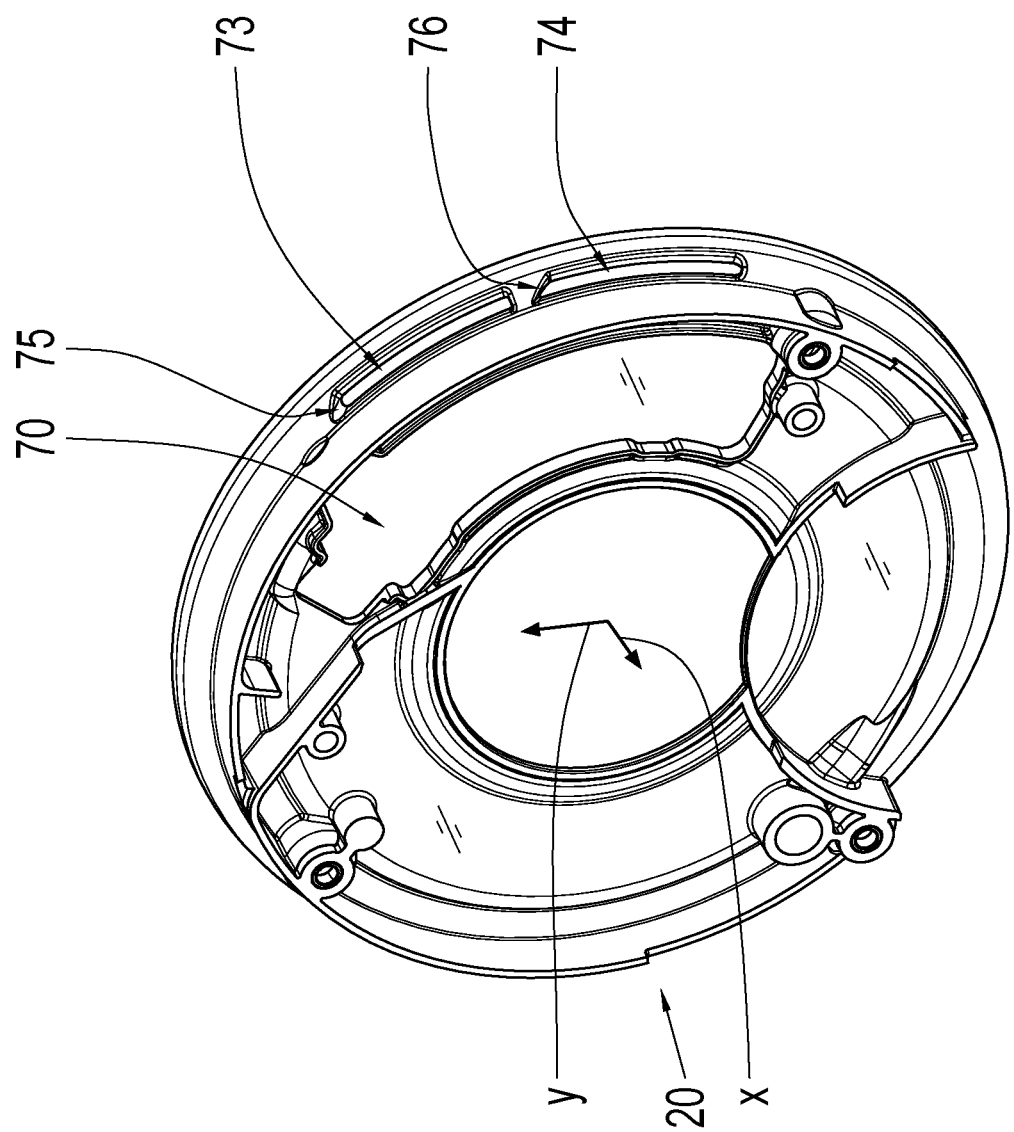
FIG. 19 shows a perspective, three-dimensional view of the second oil guide shell shown in FIG. 17 of the vehicle transmission according to FIG. 1.

FIG. 19 shows a rear view of the second oil guide shell 20 without the elastomeric seal 72, and particularly illustrating two oil ejection openings 73, 74. Each of the oil ejection openings 73, 74 includes an oil-scraper edge 75, 76, respectively, of the oil discharge area 30, in order to improve or optimize a removal of the oil from the hybrid space 4 through the oil ejector 30 of the second oil guide shell 20. Due to the embodiment of the second oil guide shell 20 that includes the two oil ejection openings 73, 74, it is easily ensured that the shift element 55 (FIG. 2) is reproducibly de-oiled via the rotor 9 (FIG. 2) or the sensor ring 25 (FIG. 2) regardless of the rising oil level in the oil sump space 3 or in the hybrid space 4.

Figure 20:
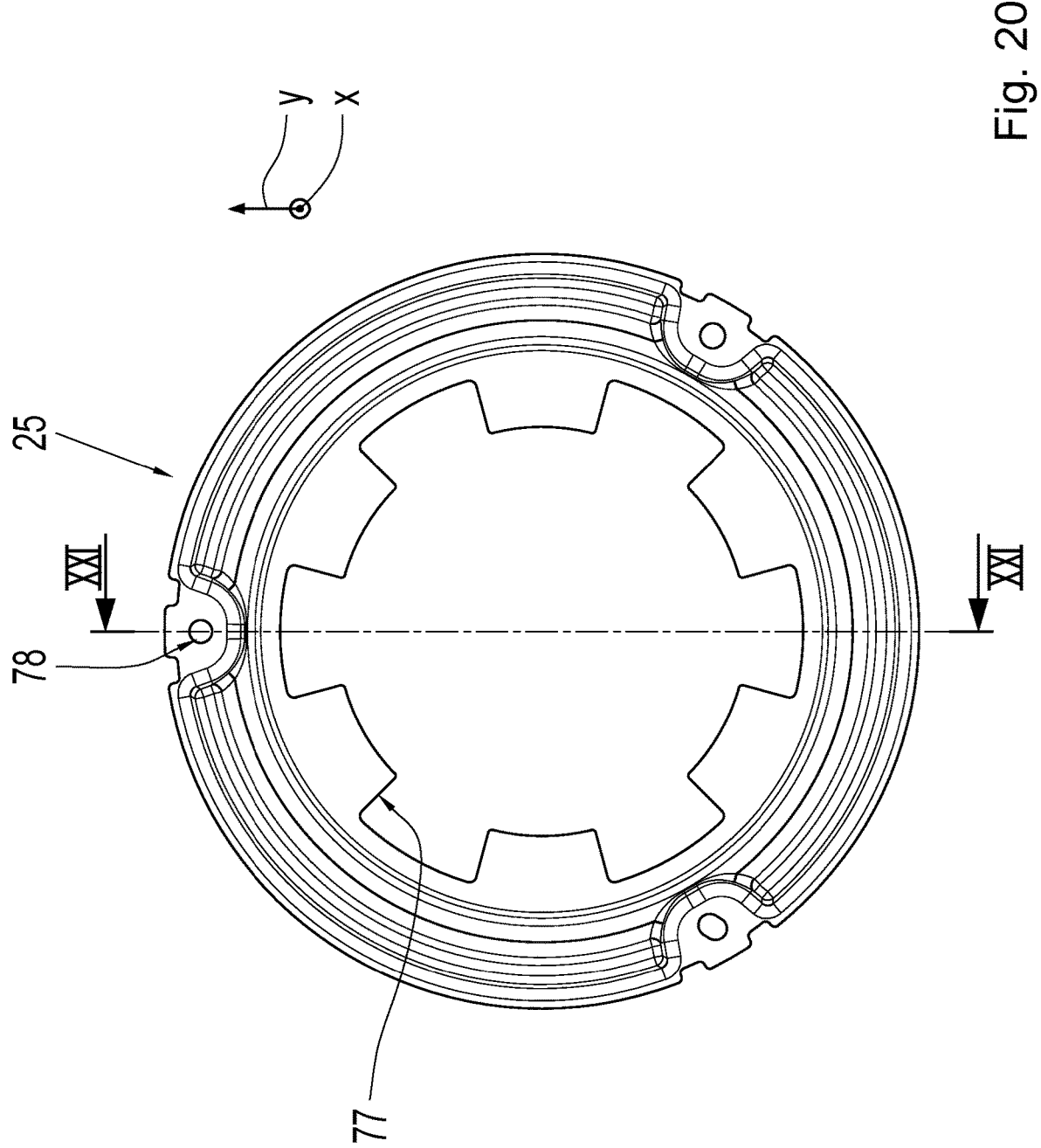
FIG. 20 shows a side view of a sensor ring of the electric machine of the vehicle transmission according to FIG. 1.
Figure 21:
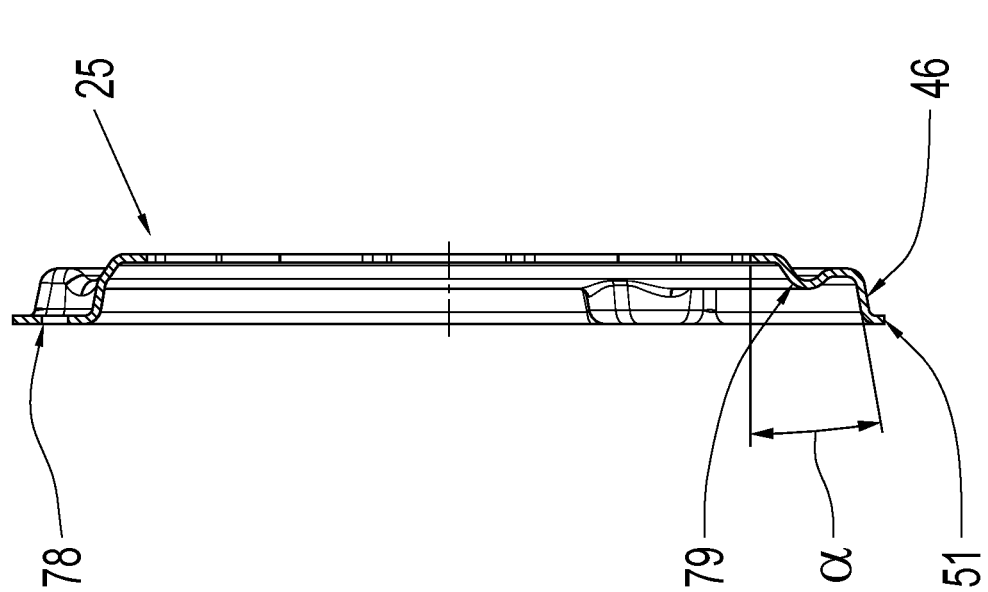
FIG. 21 shows a sectional view of the sensor ring according to FIG. 20 taken along a cutting plane XXI-XXI in FIG. 20.

The sensor ring 25 is shown in FIG. 20 in a side view and alone. In addition, FIG. 21 shows a sectional view of the sensor ring 25 taken along a cutting plane XXI-XXI in FIG. 20. The sensor ring 25 includes, at an inner diameter area thereof, a signal encoder track 77, which is detected by the rotor position sensor 26. In the outer circumferential area, the sensor ring 25 has three bolting-on points 78, in the area of which the sensor ring 25 is bolted to the rotor 9 (FIG. 2) of the electric machine 7. FIG. 21 shows, in addition to the radially outward drawn shoulder 51, a reinforcing bead 79 of the sensor ring 25, which is produced by sheet-metal forming for increasing rigidity with respect to rotational speed deformation of the sensor ring 25.

As shown in FIG. 17, the transmission ventilation is guided via two ventilation openings 101, 102 in the second oil guide shell 20 directly to a lateral face of the second oil guide shell 20, which has a small axial distance (e.g., axial gap widths AS1, AS2 in FIG. 6) to the rotating sensor ring 25. The radial flow of the oil, which results from the rotation of the sensor ring 25 (FIG. 5), generates a certain suction effect in the radial direction y in this area, via which oil is easily prevented from penetrating the vent duct (e.g., vent duct 42 in FIG. 5).

It is provided that a nominal distance of the ventilation ports 101, 102 in the second oil guide shell 20 to the end face at the sensor ring 25 preferably has values between 1 mm to 3 mm. After subtracting all tolerances, an axial minimum gap of approximately 0.5 mm sets in during operation of the vehicle transmission 1.

Figure 23:
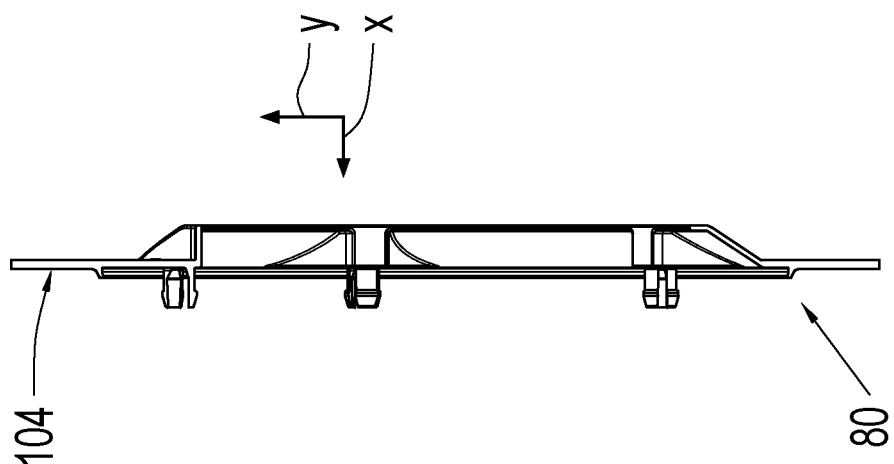
FIG. 23 shows a sectional view of the oil collecting tray according to FIG. 22 taken along a cutting plane XXIII-XXIII in FIG. 22.
Figure 22:
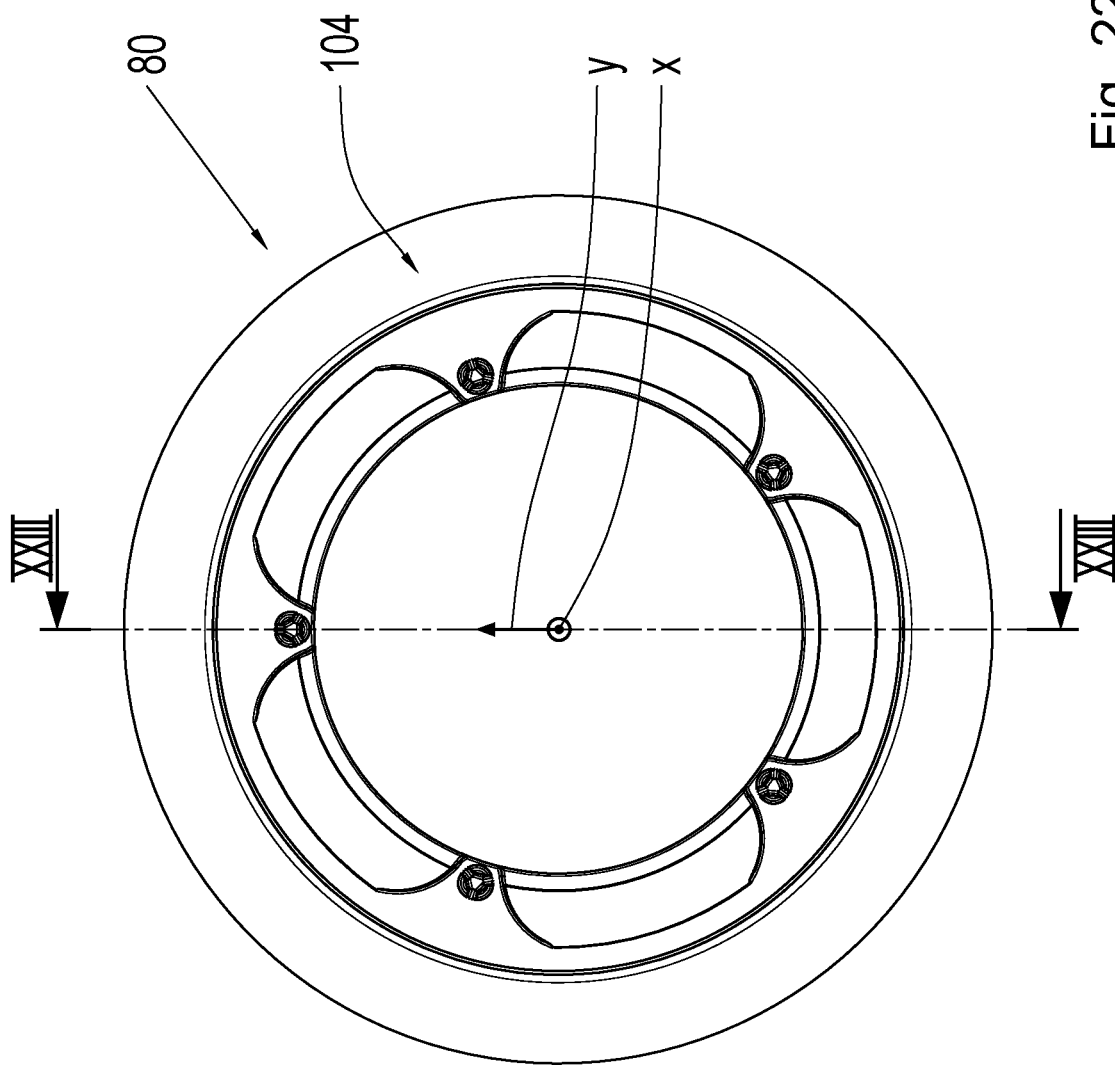
FIG. 22 shows a side view of an oil collecting tray of a rotor pre-ratio of the electric machine of the vehicle transmission according to FIG. 1, alone.

In addition, FIG. 22 shows a side view of an oil collecting tray 80 of the pre-ratio 15. In addition, FIG. 23 shows a sectional view of the oil collecting tray 80 taken along a section line XXIII-XXIII in FIG. 22. The oil collecting tray 80 includes a radially outwardly extended diameter area 104, which, as a splash guard, protects the vent hole 44 (FIGS. 7 and 8) and the vent duct 42 (FIG. 5) in the intermediate plate 27 against an entry of oil. The extended diameter area 104 of the oil collecting tray 80 extends in a radial direction y such that the oil collecting tray 80 radially overlaps the ring gear 48 (FIG. 8) of the pre-ratio 15. As a result, oil pressed axially out of the meshing of teeth of the pre-ratio 15 between the ring gear 48 and planet gears of the pre-ratio 15 is sealed off directly by the oil collecting tray 80 and does not spray toward the two ventilation openings or "transmission breather holes" 101, 102 of the second oil guide shell 20.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle transmission
 2 transmission housing
 3 oil sump space
 4 hybrid space
 5 unit, transmission oil pump
 6 housing of the transmission oil pump
 7 electric machine
 8 stator
 9 rotor
10 damper
11 torsional shock absorber
12 damper hub
13 input shaft
14 separating clutch
15 pre-ratio
16 oil level
17 oil level in the oil sump space
18 oil level in the oil sump space
19 first oil guide shell
20 second oil guide shell
21 gap seal
22 gap seal
23 bearing shield
24 centering plate
25 sensor ring
26 rotor position sensor
27 intermediate plate
28 first oil ejector or first oil discharge area of the first oil guide shell
29 second oil ejector or second oil discharge area of the first oil guide shell
30 oil ejector or oil discharge area of the second oil guide shell 20
31 oil scraper
32 oil-scraping edge
33 flow arrow
34 taper pump
35 flow arrow
36 flow arrow
37 stay bolt
38 rotor carrier
39 ventilation flow path
40 transmission breather
41 surroundings of the vehicle transmission
42 vent duct
43 area of the vent hole
44 vent hole
45 tapered inner surface of the second oil guide shell
46 tapered outer surface of the sensor ring
47 oil collecting tray
48 ring gear of the pre-ratio
49 flow arrow 50 flow arrow
51 shoulder
52 air gap
53 oil scraper of the second oil guide shell
54 cooling oil return
55 shift element
56 axial de-oiling duct
57 de-oiling opening
58 baffle plate
59 flow direction
60 oil ejection opening
61 oil ejection opening
62 oil drainage wedge
63 oil ejection opening
64 radial gap
65 flow arrow
66 arrow
67 inlet ramp
68 contour offset
69 bolting-on point
70 recess
71 opening of the second oil guide shell
72 elastomeric seal
73 oil ejection opening
74 oil ejection opening
75 oil-scraping edge
76 oil-scraping edge
77 signal encoder track
78 bolting-on points
79 reinforcing bead
80 oil collecting tray
100 oil drainage channel
101 ventilation opening
102 ventilation opening
103 nut
104 diameter area of the oil collecting tray
105 oil scraper of the oil ejector of the second oil guide shell
106 oil scraper of the second oil discharge area of the first oil guide shell
107 oil-scraping edge of the second oil discharge area of the first oil guide shell
108 radial gap between the second oil guide shell and the stator
AS1, AS2 axial gap width
RS radial gap width
R9 rotation direction of the rotor
R10 rotation direction of the damper
x axial direction
y radial direction
z vehicle vertical direction
α taper angle

The invention claimed is:

1. A vehicle transmission (1), comprising:
a transmission housing (2) defining an oil sump space (3) and a hybrid space (4), the hybrid space (4) being above the oil sump space (3) in a vehicle vertical direction (z);
a first oil guide shell (19) fixed to the transmission housing (2);
a second oil guide shell (20) fixed to the transmission housing (2); and
rotating components (7, 10, 11) installable in a portion of the hybrid space (4) between the first oil guide shell (19) and the second oil guide shell (20) in an axial direction (x), the rotating components comprising:
at least one electric machine (7);
a damper (10); and
a torsional shock absorber (11),
wherein two contactless gap seals (21, 22) are formed by one of the first oil guide shell (19) or the second oil guide shell (20) and at least one of the rotating components (7, 10, 11) in the hybrid space (4), and
wherein an oil entry from the oil sump space (3) into the portion of the hybrid space (4) is delimited in the axial direction (x) by the first and second oil guide shells (19, 20) and in a radial direction (y) by the two contactless gap seals (21, 22).

2. The vehicle transmission of claim 1, wherein the first oil guide shell (19) encircles each of the damper (10), the torsional shock absorber (11), and an input side of a rotor (9) of the at least one electric machine (7) in both the radial direction (y) and in the axial direction (x) to shield the damper (10), the torsional shock absorber (11), and the rotor (9) against oil present in the oil sump space (3).

3. The vehicle transmission of claim 2, wherein the first oil guide shell (19) has a first oil discharge area (28) and a second oil discharge area (29), oil being dischargeable from the hybrid space (4) via the first and second oil discharge areas (28, 29), the first oil discharge area (28) being radially outside of the damper (100), the second oil discharge area (29) being directly next to a laminated core of the rotor (9) in the axial direction (x).

4. The vehicle transmission of claim 3, wherein the first oil discharge area (28) of the first oil guide shell (19) is at an 8 o'clock position with respect to a direction of rotation (R9) of the rotating components (9, 10, 11) and in a circumferential direction of the first oil guide shell (19), and
wherein the first oil discharge area (28) defines an oil scraper (31) that includes a sharp oil-scraping edge (32).

5. The vehicle transmission of claim 3, wherein the second oil discharge area (29) of the first oil guide shell (19) is at a 1 o'clock position with respect to a direction of rotation (R9) of the rotating components (9, 10, 11) and in a circumferential direction of the first oil guide shell (19) for de-oiling of an input-side of the rotor (9), and
wherein the second oil discharge area (29) defines an oil scraper (106) that includes a sharp oil-scraping edge (107), an oil drainage channel (100) having a U-shaped cross-section opening away from the hybrid space 4, and an oil drainage wedge (62) at a 6 o'clock position.

6. The vehicle transmission of claim 3, further comprising a sensor ring (25) of the electric machine (7),
wherein the second oil guide shell (20) and the sensor ring (25) define a taper pump (34), the taper pump (34) being directly next to an oil discharge area (30) of the second oil guide shell (20) in the axial direction (x), the oil discharge area (30) of the second oil guide shell (20) being at a 10 o'clock position with respect to a direction of rotation (R9) of the rotating components (9, 10, 11) and in a circumferential direction of the second oil guide shell (20), the taper pump (34) being next to an output side of the laminated core of the rotor (9) in the axial direction (x).

7. The vehicle transmission of claim 6, wherein the taper pump (34) is defined by a tapered inner surface (45) of the second oil guide shell (20) and a tapered outer surface (46) of the sensor ring (25), the tapered outer surface (46) being parallel to the tapered inner surface (45).

8. The vehicle transmission of claim 6, wherein a taper angle (a) of the taper pump (34) is from 5° to 30°.

9. The vehicle transmission of claim 8, wherein the taper angle (a) of the taper pump (34) is 10°.

10. The vehicle transmission of claim 6, wherein the sensor ring (25) has a radially outward drawn shoulder (51) in a radially outer area provided on an output side of the taper pump (34).

11. The vehicle transmission of claim 6, wherein a cooling oil return (54) of a shift element (55) is connected via an axial de-oiling duct (56) to a de-oiling opening (57) in the second oil guide shell (20), the axial de-oiling duct (56) branching off from the shift element (55) at a 6 o'clock position in a circumferential direction of the shift element (55), and
    wherein the shift element (55) is a friction-locking brake.

12. The vehicle transmission of claim 11, wherein an inlet ramp (67) is provided directly adjacent to the de-oiling opening (57) of the second oil guide shell (20), the inlet ramp (57) extending in a rotation direction (R9) of the rotor (9) and of the sensor ring (25).

13. The vehicle transmission of claim 12, wherein oil from the cooling oil return (54) of the shift element (55) is guided by the inlet ramp (67) and by rotation of the sensor ring (25) toward an oil scraper (105) of the oil discharge area (30) of the second oil guide shell (20) and the taper pump (34) to output-side windings of a stator (8) of the at least one electric machine (7).

14. The vehicle transmission of claim 13, wherein the oil scraper (105) of the second oil guide shell (20) has two oil ejection openings (73, 74), each of two oil ejection openings (73, 74) including an oil-scraping edge (75, 76).

15. The vehicle transmission of claim 6, wherein a transmission ventilation extends via at least one passage opening (101, 102) of the second oil guide shell (20) defined in an end face of the second oil guide shell (20) facing the sensor ring (25).

16. The vehicle transmission of claim 1, wherein the first oil guide shell (19) is axially guidable between the transmission housing (2) and a bearing shield (23) into a radially centered position in the transmission housing (2), and
    wherein at least one contour offset (68) defined by the transmission housing (2) angularly aligns the first oil guide shell (19) in a circumferential direction with respect to the transmission housing (2).

17. The vehicle transmission of claim 1, further comprising a rotor position sensor (26); and
    an elastomeric seal (72) sealing a gap defined between the second oil guide shell (20) and the rotor position sensor (26) in the radial direction.

* * * * *